United States Patent
Kuroda et al.

(10) Patent No.: US 10,048,522 B2
(45) Date of Patent: *Aug. 14, 2018

(54) OPTICAL LAYERED BODY, POLARIZER, METHOD FOR PRODUCING POLARIZER, IMAGE DISPLAY DEVICE, METHOD FOR PRODUCING IMAGE DISPLAY DEVICE, AND METHOD FOR IMPROVING VISIBILITY OF IMAGE DISPLAY DEVICE

(71) Applicant: DAI NIPPON PRINTING CO., LTD., Tokyo (JP)

(72) Inventors: Takashi Kuroda, Tokyo (JP); Makoto Honda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 14/200,837

(22) Filed: Mar. 7, 2014

(65) Prior Publication Data
US 2014/0184994 A1 Jul. 3, 2014

Related U.S. Application Data

(63) Continuation of application No. 14/235,288, filed as application No. PCT/JP2013/064084 on May 21, 2013.

(30) Foreign Application Priority Data

May 31, 2012 (JP) .................................. 2012-125412
Oct. 5, 2012 (JP) .................................. 2012-223583

(51) Int. Cl.
*G02F 1/1333* (2006.01)
*G02F 1/13363* (2006.01)
(Continued)

(52) U.S. Cl.
CPC ........ *G02F 1/1333* (2013.01); *B29C 47/0021* (2013.01); *B29C 47/8805* (2013.01);
(Continued)

(58) Field of Classification Search
CPC ........... G02F 1/133528; G02F 1/13363; G02F 2202/40; G02B 5/3033; G02B 5/3083; G02B 5/32; B29K 2995/0034
(Continued)

(56) References Cited

U.S. PATENT DOCUMENTS 4,592,623 A * 6/1986 Yamamoto ........... G02B 5/3033
349/122
5,838,408 A 11/1998 Inoue et al.
(Continued)

FOREIGN PATENT DOCUMENTS

CN 1763608 4/2006
CN 1854766 11/2006
(Continued)

OTHER PUBLICATIONS http://bcnranking.jp/news/0608/060803_5041.html—"Difference Between "VA" and "IPS" LCD TVs—features thereof and key to select TV", Nov. 26, 2015, 7 pages with a concise explanation of relevance.
(Continued)

*Primary Examiner* — Jia Pan
(74) *Attorney, Agent, or Firm* — Hamre, Schumann, Mueller & Larson, P.C.

(57) ABSTRACT

The present invention provides a method for improving visibility of an image display device which is capable of providing an image display device excellent in anti-reflection properties and bright-field contrast even using an optical layered body including a light-transmitting substrate having in-plane birefringence, such as a polyester film. The method
(Continued)

of the present invention is a method for improving visibility of an image display device that has an optical layered body including a light-transmitting substrate having in-plane birefringence and an optical functional layer disposed on one surface of the substrate. The method includes the step of disposing the optical layered body such that the slow axis showing a greater refractive index of the light-transmitting substrate is in parallel with the vertical direction of a display screen of the image display device.

7 Claims, 1 Drawing Sheet

(51) Int. Cl.
    *G02F 1/1335* (2006.01)
    *G02B 5/30* (2006.01)
    *B32B 7/02* (2006.01)
    *G02B 1/11* (2015.01)
    *G02B 5/32* (2006.01)
    *B29C 47/00* (2006.01)
    *B29C 47/88* (2006.01)
    *B29C 47/92* (2006.01)
    *B32B 27/36* (2006.01)
    *B29L 9/00* (2006.01)
    *B29L 11/00* (2006.01)
    *B29C 47/02* (2006.01)
    *B29C 47/06* (2006.01)
    *B29C 47/14* (2006.01)
    *B29K 67/00* (2006.01)
    *B29L 7/00* (2006.01)

(52) U.S. Cl.
CPC .......... *B29C 47/8845* (2013.01); *B29C 47/92* (2013.01); *B32B 7/02* (2013.01); *G02B 1/11* (2013.01); *G02B 5/3033* (2013.01); *G02B 5/3083* (2013.01); *G02B 5/32* (2013.01); *G02F 1/13363* (2013.01); *G02F 1/133502* (2013.01); *G02F 1/133528* (2013.01); *B29C 47/0057* (2013.01); *B29C 47/025* (2013.01); *B29C 47/065* (2013.01); *B29C 47/14* (2013.01); *B29C 2947/92152* (2013.01); *B29C 2947/92247* (2013.01); *B29C 2947/92447* (2013.01); *B29C 2947/92647* (2013.01); *B29C 2947/92742* (2013.01); *B29C 2947/92942* (2013.01); *B29K 2067/003* (2013.01); *B29K 2995/0026* (2013.01); *B29K 2995/0034* (2013.01); *B29L 2007/008* (2013.01); *B29L 2009/005* (2013.01); *B29L 2011/0066* (2013.01); *B32B 27/36* (2013.01); *G02F 2001/133562* (2013.01); *G02F 2201/38* (2013.01); *G02F 2202/40* (2013.01); *G02F 2413/08* (2013.01); *Y10T 29/49778* (2015.01)

(58) Field of Classification Search
USPC ................ 349/96–98, 117–122; 359/489.01, 359/489.07, 483.01, 483
See application file for complete search history.

(56) References Cited

U.S. PATENT DOCUMENTS

| | | | |
|---|---|---|---|
| 5,998,925 A * | 12/1999 | Shimizu | C09K 11/7767 257/103 |
| 6,198,704 B1 | 3/2001 | Fukushima et al. | |
| 6,531,231 B1 | 3/2003 | Ito et al. | |
| 7,839,570 B2 | 11/2010 | Iwata et al. | |
| 2006/0216436 A1 | 9/2006 | Obara et al. | |
| 2007/0046864 A1 * | 3/2007 | Maruyama | G02B 5/3083 349/96 |
| 2007/0285777 A1 * | 12/2007 | Toyoshima | G02B 1/105 359/487.05 |
| 2008/0266661 A1 * | 10/2008 | Nakamura | G02B 5/3041 359/485.01 |
| 2008/0297703 A1 * | 12/2008 | Kawanishi | B29C 41/28 349/96 |
| 2009/0011229 A1 * | 1/2009 | Nakashima | C09D 5/24 428/339 |
| 2009/0040434 A1 | 2/2009 | Kawamoto et al. | |
| 2009/0086126 A1 | 4/2009 | Ohgaru et al. | |
| 2009/0176077 A1 | 7/2009 | Horio et al. | |
| 2009/0244474 A1 | 10/2009 | Fuchida et al. | |
| 2009/0315844 A1 | 12/2009 | Saito et al. | |
| 2010/0039708 A1 | 2/2010 | Suzuki et al. | |
| 2010/0045902 A1 | 2/2010 | Ikeda et al. | |
| 2010/0053101 A1 | 3/2010 | Nozawa et al. | |
| 2010/0053510 A1 | 3/2010 | Bitou et al. | |
| 2010/0079866 A1 | 4/2010 | Radcliffe et al. | |
| 2010/0220266 A1 * | 9/2010 | Kashima | G02B 1/105 349/96 |
| 2011/0025962 A1 | 2/2011 | Sakai et al. | |
| 2011/0128477 A1 * | 6/2011 | Izaki | H01L 51/5253 349/96 |
| 2011/0194048 A1 * | 8/2011 | Izaki | G02F 1/133528 349/62 |
| 2012/0229732 A1 | 9/2012 | Koike et al. | |
| 2012/0285528 A1 | 11/2012 | Takanohashi et al. | |
| 2013/0100378 A1 * | 4/2013 | Murata | G02F 1/133528 349/61 |
| 2013/0162930 A1 * | 6/2013 | Shin | G02F 1/13362 349/62 |
| 2013/0272020 A1 | 10/2013 | Koide et al. | |
| 2014/0004304 A1 | 1/2014 | Yu et al. | |

FOREIGN PATENT DOCUMENTS

| | | |
|---|---|---|
| CN | 1926451 | 3/2007 |
| CN | 101019043 | 8/2007 |
| CN | 101410729 | 4/2009 |
| CN | 101923245 | 12/2010 |
| CN | 102081254 | 6/2011 |
| CN | 102124398 | 7/2011 |
| CN | 102341467 | 2/2012 |
| EP | 1 804 087 | 7/2007 |
| JP | 6-258634 | 9/1994 |
| JP | 2001-129948 | 5/2001 |
| JP | 2004-163581 | 6/2004 |
| JP | 2004-205773 | 7/2004 |
| JP | 2004-345333 | 12/2004 |
| JP | 2005-300978 | 10/2005 |
| JP | 2006-163156 | 6/2006 |
| JP | 2007-094396 | 4/2007 |
| JP | 2007-316603 | 6/2007 |
| JP | 2007187717 | 7/2007 |
| JP | 2007-233392 | 9/2007 |
| JP | 2008-018543 | 1/2008 |
| JP | 2008-073999 | 4/2008 |
| JP | 2008-176059 | 7/2008 |
| JP | 2008-209877 | 9/2008 |
| JP | 2009-086470 | 4/2009 |
| JP | 2009-139642 | 6/2009 |
| JP | 2009-157343 | 7/2009 |
| JP | 2010-008693 | 1/2010 |
| JP | 2010-032734 | 2/2010 |
| JP | 2010-078636 | 4/2010 |
| JP | 2010-078758 | 4/2010 |
| JP | 2010-107542 | 5/2010 |
| JP | 2010-139823 | 6/2010 |
| JP | 2010-217844 | 9/2010 |
| JP | 2010-244059 | 10/2010 |
| JP | 2010-277028 | 12/2010 |
| JP | 2010-286539 | 12/2010 |
| JP | 2011-034103 | 2/2011 |
| JP | 2011-053271 | 3/2011 |
| JP | 2011-059266 | 3/2011 |
| JP | 2011059488 A * | 3/2011 |

(56) References Cited

FOREIGN PATENT DOCUMENTS

| | | |
|---|---|---|
| JP | 2011-107198 | 6/2011 |
| JP | 2011-167914 | 9/2011 |
| JP | 2011-197656 | 10/2011 |
| JP | 2012-058433 | 3/2012 |
| JP | 2012-068641 | 4/2012 |
| JP | 2012-087290 | 5/2012 |
| JP | 2012521578 | 9/2012 |
| JP | 2014-006497 | 1/2014 |
| KR | 10-2010-0090647 | 8/2010 |
| TW | 200422663 | 11/2004 |
| TW | 200426406 | 12/2004 |
| WO | 96/13752 | 5/1996 |
| WO | 2008/041506 | 4/2008 |
| WO | 2009/050912 | 4/2009 |
| WO | 2011049188 A1 | 4/2011 |
| WO | 2011/162198 | 12/2011 |
| WO | 2012/049977 | 4/2012 |

OTHER PUBLICATIONS http://ascii.jp/elem/000/001/027/1027406—"What's the difference between "VA" and "IPS"?—Getting knowledge of operation of LCD TV", Nov. 26, 2015, 4 pages with a concise explanation of relevance.
Optical Materials for FDP (Flat Panel Display) "From basic to application", Published by Muneaki Suzuki—Techno Times Corp., Oct. 17, 2007, 9 pages with a partial translation.
U.S. Appl. No. 14/235,288, filed Jan. 27, 2014, US 2014/0211310.
U.S. Appl. No. 14/275,397, filed May 12, 2014, US 2014/0247413.
U.S. Appl. No. 14/275,442, filed May 12, 2014, US 2014/0247414.

\* cited by examiner

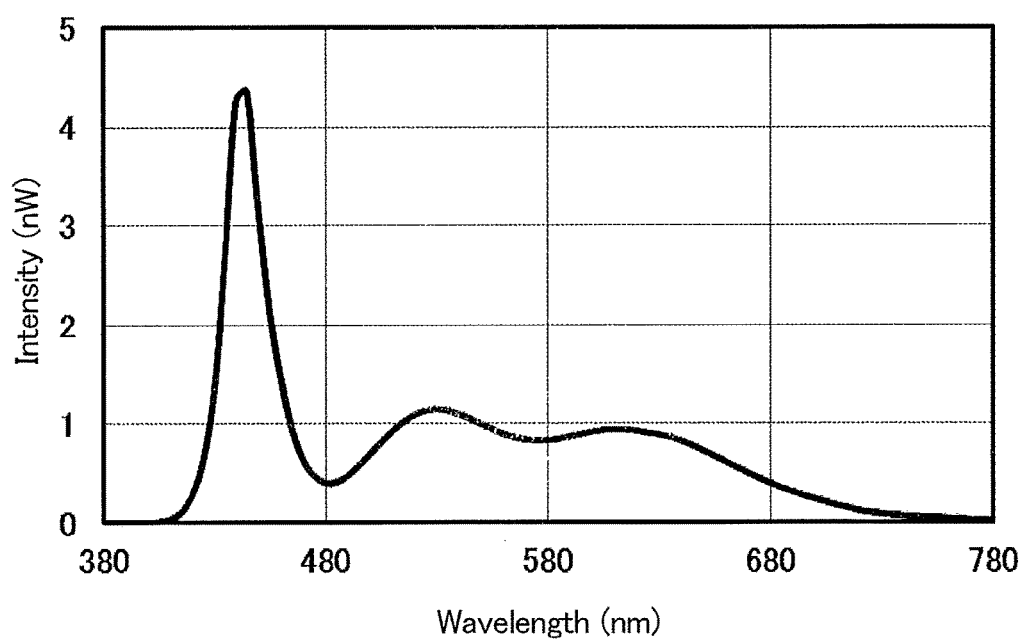

OPTICAL LAYERED BODY, POLARIZER, METHOD FOR PRODUCING POLARIZER, IMAGE DISPLAY DEVICE, METHOD FOR PRODUCING IMAGE DISPLAY DEVICE, AND METHOD FOR IMPROVING VISIBILITY OF IMAGE DISPLAY DEVICE

TECHNICAL FIELD

The present invention relates to an optical layered body, a polarizer, a method for producing a polarizer, an image display device, a method for producing an image display device, and a method for improving visibility of an image display device.

BACKGROUND ART

Liquid crystal display devices have various advantages such as low power consumption, light weight, and slim profile. Owing to these advantages, they have taken the place of conventional CRT displays and have rapidly spread in these days.

Such a liquid crystal display device is provided with a polarizing element on the image display screen of its liquid crystal cell, and the polarizing element usually requires hardness so as to prevent damages when handled. In general, such hardness is imparted to an image display screen by providing, as a polarizer-protecting film, a hard coat film that includes a light-transmitting substrate and a hard coat layer disposed on the substrate.

Conventionally used light-transmitting substrates for such a hard coat film are cellulose ester films such as triacetyl cellulose films. This is based on the following advantages of the cellulose esters; that is, the cellulose esters have excellent transparency and optical isotropy and have little in-plane phase difference (have a low retardation value), and thus they hardly change the vibration direction of incident linearly polarized light and they have less influence on the display quality of liquid crystal display devices. In addition, the cellulose esters have appropriate water permeability. Thus, when a polarizer comprising an optical layered body is produced, the water remained in the polarizer can be dried through the optical layered body.

Such a cellulose ester film also has insufficient moisture and heat resistance. Such insufficient characteristics thus deteriorate the properties of the polarizer such as polarizing function and color phase when the hard coat film is used as a polarizer-protecting film in a high-temperature and high-humidity environment. Further, a cellulose ester is a disadvantageous material in terms of cost.

Such disadvantages of the cellulose ester films provide a demand for using, as a light-transmitting substrate of an optical layered body, a versatile film that has excellent transparency, heat resistance, and mechanical strength and can be more easily and more inexpensively available in the market than cellulose ester films or can be produced by a simpler method. For example, a polyester film such as polyethylene terephthalate is experimentally used as a substitution for a cellulose ester film (e.g. see Patent Literature 1 to 3).

However, a polyester film has a high-polarizability aromatic ring in its molecular chain and thus has very high intrinsic birefringence. Accordingly, the polyester film has a characteristic of easily exhibiting birefringence accompanying orientation of the molecular chain as a result of stretching treatment for imparting excellent transparency, heat resistance, and mechanical strength. An optical layered body that comprises a light-transmitting substrate having in-plane birefringence such as the above polyester film, when disposed on the surface of an image display device, may extremely decrease the anti-reflection properties on the surface of the optical layered body and may decrease the bright-field contrast.

CITATION LIST

Patent Literature

Patent Literature 1: JP 2004-205773 A
Patent Literature 2: JP 2009-157343 A
Patent Literature 3: JP 2010-244059 A

SUMMARY OF INVENTION

Technical Problem

The present invention is devised in consideration of the above situation, and aims to provide an optical layered body and a polarizer each of which can provide an image display device having excellent anti-reflection properties and bright-field contrast and being capable of preventing a rainbow interference pattern even though a light-transmitting substrate having in-plane birefringence such as a polyester film is used therein, a method for producing the polarizer, an image display device comprising the optical layered body or the polarizer, a method for producing the image display device, and a method for improving visibility of an image display device.

The phrase "visibility is improved" herein means that at least the anti-reflection properties and the bright-field contrast are excellent. Further, the phrase "visibility is well improved" herein means that a rainbow interference pattern is additionally prevented.

The phrase "rainbow interference pattern" means unevenness with different colors appearing on a display screen of an image display device when an optical layered body having a conventional polyester film as a light-transmitting substrate is disposed on the surface of the image display device and when a person wearing polarized sunglasses see the display screen. This phenomenon deteriorates display quality.

Solution to Problem

The present invention relates to an optical layered body configured to be disposed on a surface of an image display device, the optical layered body comprising: a light-transmitting substrate having in-plane birefringence; and an optical functional layer disposed on one surface of the light-transmitting substrate, the light-transmitting substrate having a slow axis that is along the direction showing a greater refractive index, and the optical layered body being configured to be disposed on a display screen of the image display device such that the slow axis is in parallel with the vertical direction of the display screen.

Preferably, the light-transmitting substrate has a fast axis that is orthogonal to the slow axis, and the difference between refractive indexes (nx−ny) is 0.05 or greater, where nx represents a refractive index in the slow axis direction and ny represents a refractive index in the fast axis direction.

The light-transmitting substrate in the optical layered body of the present invention preferably has a retardation of 3000 nm or greater.

The light-transmitting substrate is preferably a substrate formed from a polyester, and the polyester is preferably polyethylene terephthalate or polyethylene naphthalate.

Preferably, the optical layered body of the present invention further comprises a primer layer disposed between the light-transmitting substrate and the optical functional layer, wherein the primer layer is 3 to 30 nm in thickness provided that: the primer layer has a refractive index (np) that is greater than the refractive index (nx) in the slow axis direction of the light-transmitting substrate and that is greater than the refractive index (nf) of the optical functional layer (np>nx and np>nf), or the primer layer has a refractive index (np) that is smaller than the refractive index (ny) in the fast axis direction of the light-transmitting substrate and that is smaller than the refractive index (nf) of the optical functional layer (np<ny and np<nf).

Preferably, the optical layered body of the present invention further comprises a primer layer disposed between the light-transmitting substrate and the optical functional layer, wherein the primer layer is 65 to 125 nm in thickness provided that: the primer layer has a refractive index (np) that is greater than the refractive index (nx) in the slow axis direction of the light-transmitting substrate but that is smaller than the refractive index (nf) of the optical functional layer (nx<np<nf), or the primer layer has a refractive index (np) that is smaller than the refractive index (ny) in the fast axis direction of the light-transmitting substrate but that is greater than the refractive index (nf) of the optical functional layer (nf<np<ny).

Preferably, the optical layered body of the present invention further comprises a primer layer disposed between the light-transmitting substrate and the optical functional layer, wherein the primer layer has a refractive index (np) that falls between the refractive index (ny) in the fast axis direction of the light-transmitting substrate and the refractive index (nx) in the slow axis direction of the light-transmitting substrate (ny<np<nx).

The present invention also relates to a polarizer that is configured to be disposed on a surface of an image display device, the polarizer comprising: a polarizing element; and an optical layered body disposed on the polarizing element, the optical layered body including: a light-transmitting substrate having in-plane birefringence; and an optical functional layer disposed on one surface of the light-transmitting substrate, the light-transmitting substrate having a slow axis with a greater refractive index, the polarizing element having an absorption axis, the optical layered body and the polarizing element being disposed such that the slow axis of the light-transmitting substrate and the absorption axis of the polarizing element are orthogonal to each other, and the polarizer being configured to be disposed on a display screen of the image display device such that the slow axis of the light-transmitting substrate is in parallel with the vertical direction of the display screen.

Preferably, the light-transmitting substrate having in-plane birefringence in the polarizer of the present invention further has a fast axis that is orthogonal to the slow axis, and the difference between the refractive indexes (nx−ny) is 0.05 or greater, where nx represents a refractive index in the slow axis direction and ny represents a refractive index in the fast axis direction.

The light-transmitting substrate having in-plane birefringence preferably has a retardation of 3000 nm or greater.

Preferably, the polarizer of the present invention further comprises a primer layer disposed between the light-transmitting substrate and the optical functional layer, wherein the primer layer is 3 to 30 nm in thickness provided that: the primer layer has a refractive index (np) that is greater than the refractive index (nx) in the slow axis direction of the light-transmitting substrate and that is greater than the refractive index (nf) of the optical functional layer (np>nx and np>nf), or the primer layer has a refractive index (np) that is smaller than the refractive index (ny) in the fast axis direction of the light-transmitting substrate and that is smaller than the refractive index (nf) of the optical functional layer (np<ny and np<nf).

Preferably, the polarizer of the present invention further comprises a primer layer disposed between the light-transmitting substrate and the optical functional layer, wherein the primer layer is 65 to 125 nm in thickness provided that: the primer layer has a refractive index (np) that is greater than the refractive index (nx) in the slow axis direction of the light-transmitting substrate but that is smaller than the refractive index (nf) of the optical functional layer (nx<np<nf), or the primer layer has a refractive index (np) that is smaller than the refractive index (ny) in the fast axis direction of the light-transmitting substrate but that is greater than the refractive index (nf) of the optical functional layer (nf<np<ny).

Preferably, the polarizer of the present invention further comprises a primer layer disposed between the light-transmitting substrate and the optical functional layer, wherein the primer layer has a refractive index (np) that falls between the refractive index (ny) in the fast axis direction of the light-transmitting substrate and the refractive index (nx) in the slow axis direction of the light-transmitting substrate (ny<np<nx).

The present invention also relates to an image display device comprising the optical layered body of the present invention or the polarizer of the present invention.

The image display device of the present invention is preferably a VA-mode or IPS-mode liquid crystal display device comprising a white-light-emitting diode as a backlight light source.

The present invention also relates to a method for producing an image display device, the image display device including an optical layered body that has a light-transmitting substrate having in-plane birefringence and an optical functional layer disposed on one surface of the light-transmitting substrate, the light-transmitting substrate having a slow axis that extends along the direction showing a greater refractive index, the method comprising disposing the optical layered body such that the slow axis of the light-transmitting substrate is in parallel with the vertical direction of a display screen of the image display device.

The present invention also relates to a method for improving visibility of an image display device, the image display device including an optical layered body that has a light-transmitting substrate having in-plane birefringence and an optical functional layer disposed on one surface of the light-transmitting substrate, the light-transmitting substrate having a slow axis that extends along the direction showing a greater refractive index, the method comprising disposing the optical layered body such that the slow axis of the light-transmitting substrate is in parallel with the vertical direction of a display screen of the image display device.

The present invention will be described in detail below.

In the present invention, curable resin precursors such as monomers, oligomers, and pre-polymers are also referred to as "resin" unless otherwise mentioned.

As a result of diligent studies, the present inventors have found that an image display device with excellent anti-reflection properties and bright-field contrast can be provided by disposing an optical layered body or a polarizer that comprises a light-transmitting substrate having in-plane birefringence on the image display device such that the slow axis, which extends along the direction with a greater refractive index, of the light-transmitting substrate extends in a specific direction relative to the absorption axis of the polarizing element or a display screen of the image display device. Thereby, the present inventors have completed the present invention. The cellulose ester film, such as a triacetyl cellulose film, conventionally used as an optical layered body as mentioned above is excellent in optical isotropy and hardly has in-plane phase difference. Thus, an optical layered body or a polarizer comprising the cellulose ester film as a light-transmitting substrate requires no consideration in the direction of disposing the light-transmitting substrate. In other words, the aforementioned disadvantages about the anti-reflection properties and the bright-field contrast arise from the use of a light-transmitting substrate having in-plane birefringence as the light-transmitting substrate of an optical layered body.

A liquid crystal display device looked over a polarized sunglasses disadvantageously exhibits deteriorated visibility depending on the angle between the absorption axis of the polarizer of the liquid crystal display device and the absorption axis of the polarized sunglasses. One known method for improving this visibility is to dispose a light-transmitting substrate having in-plane birefringence such as a λ/4 phase-difference film at a position closer to the observer than the observer-side polarizer in the liquid crystal display device. This is a method of controlling the intensity of transmitted light that is measured under the crossed-nicols state and that is represented by the following formula:

$$I = I_0 \cdot \sin^2(2\theta) \cdot \sin^2(\pi \cdot Re/\lambda)$$

wherein θ represents the angle between the absorption axis of the polarizer and the slow axis of the light-transmitting substrate having in-plane birefringence; I represents the intensity of light passed through the crossed-nicols state; $I_0$ represents the intensity of light entering the light-transmitting substrate having in-plane birefringence; λ represents the wavelength of light; and Re represents the retardation.

The value of $\sin^2(2\theta)$ depends on the value of θ and is 0 to 1. In the method for improving visibility where the display device is looked over polarized sunglasses, the value θ is set to 45° in many cases so as to achieve $\sin^2(2\theta)=1$, thereby providing a greater intensity of the passing light.

However, the optical layered body of the present invention is devised on the basis of a technical idea that is completely different from the aforementioned technique using polarized sunglasses based on the above formula.

The optical layered body of the present invention has a light-transmitting substrate having in-plane birefringence and an optical functional layer disposed on one surface of the light-transmitting substrate. The optical layered body is configured to be disposed on the surface of an image display device such that the slow axis extending along the direction showing a greater refractive index of the light-transmitting substrate is in parallel with the vertical direction of a display screen of the image display device.

An image display device is usually placed in a room. Thus, prevention of reflection of light that is reflected on a wall surface or floor surface on the display screen (the surface of the optical layered body) of the image display device enables to give excellent anti-reflection properties.

The present inventors have focused on the fact that most part of the light reflected on a wall surface or floor surface and entering the display screen of the image display device vibrates in the horizontal direction of the display screen.

Then, they have designed that the optical layered body of the present invention is disposed such that the slow axis extending along the direction showing a greater refractive index of the light-transmitting substrate is in parallel with the vertical direction of the display screen of the image display device. In other words, the optical layered body of the present invention is limited to be disposed on the surface of an image display device, and an image display device having the optical layered body of the present invention disposed thereon satisfies that the slow axis extending along the direction showing a greater refractive index of the light-transmitting substrate is orthogonal to the vibration direction of the light reflected on a wall surface or floor surface. As mentioned here, the image display device having an optical layered body disposed thereon such that the slow axis extending along the direction showing a greater refractive index of the light-transmitting substrate is in a specific direction is excellent in anti-reflection properties and bright-field contrast.

This is because the image display device having the optical layered body of the present invention disposed thereon in the aforementioned specific state satisfies that the fast axis, which extends along the direction showing a smaller refractive index, of the light-transmitting substrate is in parallel with the light (S-polarized light) that vibrates in the horizontal direction where a greater part of the light enters the display screen, and thus can reduce reflection of natural light on the outermost surface.

The reason of this is as follows. The reflectance R on the surface of a substrate having a refractive index N is represented by the formula:

$$R = (N-1)^2/(N+1)^2.$$

For a substrate having refractive index anisotropy such as the light-transmitting substrate in the optical layered body of the present invention, the optical layered body having the aforementioned structure in the image display device increases the ratio of the refractive index of the fast axis with a smaller refractive index to be applied to the refractive index N.

Because of the above reason, the reflectance in the case where the optical layered body comprising a light-transmitting substrate having in-plane phase difference is disposed on an image display device without the consideration of the direction of disposing the substrate is greater than the reflectance in the case where such an optical layered body is disposed such that the slow axis direction with a greater refractive index of the light-transmitting substrate is in a specific direction as in the present invention. The phrase "excellent in anti-reflection properties" in the present invention means the aforementioned state.

For the optical layered body of the present invention that is disposed on an image display device so as to have the aforementioned configuration, the reflectance thereof is preferably similar to that achieved by a film as a substrate that is excellent in optical isotropy and hardly has an in-plane phase difference (e.g. cellulose ester film such as triacetyl cellulose film). For example, a film formed from triacetyl cellulose has a reflectance of about 4.39%.

The contrast of an image display device consists of the dark-field contrast and the bright-field contrast. The dark-field contrast is calculated based on the formula (luminance in white screen)/(luminance in black screen), whereas the bright-field contrast is calculated based on the formula {(luminance in white screen+natural light reflection)/(luminance in black screen+natural light reflection)}. In either contrast, a greater influence of the denominator leads to a lower contrast. In other words, reduction in the natural light reflection on the outermost surface leads to an increase in the bright-field contrast.

The phrase "an optical layered body is disposed on an image display device such that the slow axis extending along the direction showing a greater refractive index of the light-transmitting substrate is in parallel with the vertical direction of a display screen of the image display device" means that the optical layered body is disposed on the image display device such that the slow axis forms an angle of 0°±40° with the vertical direction of the display screen.

In the optical layered body of the present invention, the angle between the slow axis of the light-transmitting substrate and the vertical direction of the display screen is preferably 0°±30°, more preferably 0°±10°, and still more preferably 0°±5°. An angle of 0°±40° between the slow axis of the light-transmitting substrate and the vertical direction of the display screen in disposing the optical layered body of the present invention enables to improve the bright-field contrast owing to the optical layered body of the present invention.

In order to improve the bright-field contrast owing to the optical layered body of the present invention, the angle between the slow axis of the light-transmitting substrate and the vertical direction of the display screen is most preferably 0°. Thus, the angle between the slow axis of the light-transmitting substrate and the vertical direction of the display screen is preferably 0°±30°, and more preferably 0°±10°, rather than 0°±40°. Further, the angle between the slow axis of the light-transmitting substrate and the vertical direction of the display screen is still more preferably 0°±5° because such an angle enables to improve the bright-field contrast as much as the angle of 0°.

With respect to the angle between the above two axes seen from the observer side herein, the angle formed in the clockwise direction relative to the substrate angle is defined as plus (+), whereas the angle formed in the counterclockwise direction relative to the substrate angle is defined as minus (−). Angles with no specific symbol are each an angle formed in the clockwise direction relative to the substrate angle (that is, the angle is a plus angle).

The light-transmitting substrate having in-plane birefringence is not particularly limited, and examples thereof include substrates formed from polycarbonates, acrylics, and polyesters. Preferable are polyester substrates that are advantageous in terms of cost and mechanical strength. The following description will be made using a polyester substrate as the light-transmitting substrate having in-plane birefringence.

The polyester substrate preferably has a retardation of 3000 nm or higher so as to prevent a rainbow interference pattern and provide very good visibility. A retardation of lower than 3000 nm may cause sighting of a rainbow interference pattern like a rainbow-colored striped pattern and reduction in display quality when the optical layered body of the present invention is used for a liquid crystal display device (LCD). The upper limit of the retardation of the polyester substrate is not particularly limited, and is preferably about 30,000 nm. A substrate with a retardation exceeding 30,000 nm may be considerably thick and thus is not preferred.

The retardation of the polyester substrate is preferably 5,000 to 25,000 nm for film thinning. The retardation is more preferably 7,000 to 20,000 nm. A retardation within this range enables to prevent a rainbow interference pattern more favorably even though the optical layered body of the present invention is disposed on an image display device such that the slow axis of the polyester substrate forms an angle of 0°±30° to 0°±40° with the vertical direction of the display screen, in other words, the slow axis of the polyester substrate and the vertical direction of the display screen form an angle that slightly shifts from the perfectly parallel state. Even though the slow axis of the polyester substrate forms an angle of ±30° to 40° from the perfectly parallel state with the vertical direction of the display screen, the optical layered body of the present invention with a retardation of 3000 nm or higher enables to prevent a rainbow interference pattern, and thus has no disadvantages in practical use. Nevertheless, the angle between the slow axis of the light-transmitting substrate and the vertical direction of the display screen is most preferably 0° as mentioned above. Therefore, the angle between the slow axis of the light-transmitting substrate and the vertical direction of the display screen is more preferably 0°±10°, and still more preferably 0°±5°.

The retardation is represented by the following formula:

$$\text{Retardation }(Re)=(nx-ny)\times d$$

wherein nx represents the refractive index in the direction with the greatest refractive index in the plane of the polyester substrate (slow axis direction); ny represents the refractive index in the direction orthogonal to the slow axis direction (fast axis direction); and d represents the thickness of the polyester substrate.

The retardation can be measured using KOBRA-WR (Oji Scientific Instruments) (measurement angle: 0°; measurement wavelength: 589.3 nm), for example.

Two polarizers are used to determine the direction of orientation axis (the direction of principal axis) of the polyester substrate, and then the refractive indexes (nx and ny) of the two axes orthogonal to the direction of polarization axis are measured using an Abbe refractometer (NAR-4T, ATAGO CO., LTD,). The axis showing a greater refractive index is defined as the slow axis. The thickness d (nm) of the polyester substrate is measured using an electric micrometer (ANRITSU CORP.) and the unit is converted into nanometer. The retardation may be calculated by multiplying the difference between the refractive indexes (nx−ny) by the thickness d (nm) of the film.

The refractive index can be measured using an Abbe refractometer or an ellipsometer, or can be measured using a spectrophotometer (UV-3100PC, Shimadzu Corp.) as follows; that is, the average reflectance (R) of the optical functional layer at a wavelength of 380 to 780 nm of the optical layered body of the present invention is first measured, and then the refractive index (n) is calculated from the obtained average reflectance (R) based on the below-mentioned formula.

The average reflectance (R) of the optical functional layer is measured as follows. A material composition is applied onto one surface of each a PET film with a thickness of 50 μm without primer treatment and each material composition applied is formed into a curable film with a thickness of 1 to 3 μm; the other surface (back side) of the PET with no coating is covered by a black plastic tape (e.g. Yamato Vinyl Tape No200-38-21, 38 mm width) that is wider than the measurement-spot area for prevention of back reflection; and the average reflectance of each curable film is measured. The refractive index of the polyester substrate is also measured after a black plastic tape is attached onto the side opposite to the measurement side.

$$R(\%)=(1-n)^2/(1+n)^2$$

Examples of a method for measuring the refractive index of the optical functional layer after formation of an optical layered body include a method of shaving off the cured film of each layer using, for example, a cutter to prepare a powdery sample and then performing the Becke method on the sample in conformity with the B method in JIS K7142 (2008) (for powdery or granular transparent materials). The Becke method is a method including: placing a powdery sample on, for example, a glass slide; dripping a Cargille reagent with a known refractive index onto the sample to immerse the sample in the reagent; microscopically observing the state of immersion; and determining a reagent that provides no bright line (Becke line), which occurs along the sample outline when the sample and the reagent have different refractive indexes, in the visual observation. The refractive index of such a reagent is defined as the refractive index of the sample. Since the polyester substrate has different refractive indexes (nx and ny) in different directions, the refractive indexes can also be measured not by the Becke method but by the following method. That is, a black plastic tape is attached to a treated surface of the optical functional layer; the 5-degree reflectance of the light-transmitting substrate with the slow axis set in parallel and that with the fast axis set in parallel are measured using S-polarized light with a spectrophotometer (automatic absolute reflectance measurement unit V7100-series, VAR-7010, JASCO Corp.) (polarized light measurement); and the refractive indexes (nx and ny) in the slow axis and the fast axis can be calculated on the basis of the aforementioned formula.

In the case where the polyester substrate is a PET substrate formed from polyethylene terephthalate (PET) to be mentioned later in the present invention, the (nx−ny) value (hereinafter also referred to as $\Delta n$) is preferably 0.05 or higher. The substrate with a $\Delta n$ value of lower than 0.05 may have too high a refractive index in the fast axis, and thus may fail to improve the bright-field contrast of an image display device. Further, the substrate may disadvantageously require a greater thickness so as to achieve the aforementioned retardation. On the other hand, the $\Delta n$ is preferably 0.25 or lower. The PET substrate with a $\Delta n$ exceeding 0.25 may need excessive stretching. This excessive stretching easily causes the PET substrate to suffer rents, tears, or the like, and thereby markedly deteriorates the practicality of the substrate as an industrial material.

From the above points of view, the lower limit of the $\Delta n$ of the PET substrate is more preferably 0.07, whereas the upper limit thereof is more preferably 0.20. The PET substrate with a $\Delta n$ exceeding 0.20 may have poor durability in a moisture and heat resistance test. The upper limit of the $\Delta n$ of the PET substrate is more preferably 0.15 for excellent durability of the substrate in the moisture and heat resistance test.

The nx value of the PET substrate is preferably 1.66 to 1.78. The lower limit thereof is more preferably 1.68, whereas the upper limit thereof is more preferably 1.73. The ny value of the PET substrate is preferably 1.55 to 1.65. The lower limit thereof is more preferably 1.57, whereas the upper limit thereof is more preferably 1.62.

The nx and ny values within the above range and satisfying the above relationship about the $\Delta n$ enable to favorably improve the anti-reflection properties and the bright-field contrast.

In the case where the polyester substrate is a PEN substrate formed from polyethylene naphthalate (PEN) to be mentioned later, the lower limit of the $\Delta n$ is preferably 0.05, whereas the upper limit thereof is preferably 0.30. The substrate with a $\Delta n$ of lower than 0.05 is not preferred because it may require a greater thickness so as to achieve the aforementioned retardation. In contrast, the PEN substrate with a $\Delta n$ exceeding 0.30 may easily suffer rents, tears, or the like, and may thereby have markedly deteriorated practicality as an industrial material. The lower limit of the $\Delta n$ of the PEN substrate is more preferably 0.07, whereas the upper limit thereof is more preferably 0.27. A $\Delta n$ of lower than 0.07 may have difficulty in achieving the aforementioned effects of sufficiently preventing a rainbow interference pattern and color-tone change. The PEN substrate with a $\Delta n$ exceeding 0.27 may have poor durability in the moisture and heat resistance test. The upper limit of the $\Delta n$ of the PEN substrate is still more preferably 0.25 for excellent durability in the moisture and heat resistance test.

The nx value of the PEN substrate is preferably 1.70 to 1.90. The lower limit thereof is more preferably 1.72, whereas the upper limit thereof is more preferably 1.88. The ny value of the PEN substrate is preferably 1.55 to 1.75. The lower limit thereof is more preferably 1.57, whereas the upper limit thereof is more preferably 1.73.

Any material satisfying the above retardation may be used for the polyester substrate. Examples thereof include linear saturated polyesters synthesized from any of aromatic dibasic acids and ester-forming derivatives thereof and any of diols and ester-forming derivatives thereof. Specific examples of the polyesters include polyethylene terephthalate, polyethylene isophthalate, polybutylene terephthalate, poly(1,4-cyclohexylene dimethylene terephthalate), and polyethylene naphthalate (e.g. polyethylene-2,6-naphthalate, polyethylene-1,4-naphthalate, polyethylene-1,5-naphthalate, polyethylene-2,7-naphthalate, and polyethylene-2,3-naphthalate). The polyester used for the polyester substrate may be a copolymer of these polyesters, or may be one prepared by blending a polyester as a main component (for example, 80 mol % or more) and one or more other resins each in a small amount (for example, 20 mol % or lower). The polyester is particularly preferably polyethylene terephthalate or polyethylene naphthalate because of their good balance of properties such as mechanical physical properties and optical characteristics. The polyester is particularly preferably polyethylene terephthalate (PET). This is because polyethylene terephthalate is very versatile and is readily available. The present invention enables to provide an optical layered body which provides a liquid crystal display device with high display quality even with a very versatile film such as PET. Further, PET is excellent in transparency and in heat or mechanical characteristics, the retardation of which may be controlled by stretching. In addition, PET has high intrinsic birefringence. Thus, even a thin substrate relatively easily has a high retardation.

The polyester substrate may be obtained by any method that provides the above retardation. Examples thereof include a method in which a material polyester such as PET is molten; the molten polyester is extrusion-molded into a sheet to prepare an unstretched polyester; the unstretched polyester is stretched in the transverse direction at a temperature not lower than the glass transition temperature using, for example, a tenter; and then the stretched film is subjected to heat treatment.

The transverse direction stretching temperature is preferably 80° C. to 130° C., and more preferably 90° C. to 120° C. The transverse direction stretching ratio is preferably 2.5 to 6.0 times, and more preferably 3.0 to 5.5 times. A transverse direction stretching ratio exceeding 6.0 times may easily decrease the transparency of the polyester substrate. A stretching ratio of lower than 2.5 times may cause a lower stretching tension, thereby providing low birefringence of the polyester substrate and failing to provide a retardation of 3000 nm or higher.

In the present invention, the transverse direction stretching of the unstretched polyester under the aforementioned conditions may be followed by stretching in the flow direction (hereinafter, also referred to as machine direction stretching) using a biaxial stretching tester relative to the transverse direction stretching. In this case, the stretching ratio of the machine direction stretching is preferably twice or lower. A stretching ratio of higher than twice in the machine direction stretching may fail to set the Δn within the above preferable range.

The temperature at the heat treatment is preferably 100° C. to 250° C., and more preferably 180° C. to 245° C.

A conventional polyester substrate is obtained by stretching an unstretched polyester substrate in the longitudinal direction and then stretching it in the width direction at a similar ratio for the longitudinal direction stretching. However, the polyester substrate obtained by such a stretching method easily suffers a bowing phenomenon. In contrast, the polyester substrate having the above retardation value of the present invention can be obtained by stretching a roll-shaped upstretched optically transparent film only in the width direction or by slightly stretching the film in the machine direction and then stretching the film in the width direction. The polyester substrate thus obtained enables to prevent the bowing phenomenon and its slow axis extends along the width direction.

As is mentioned later, the optical layered body of the present invention may be disposed on a polarizing element to form a polarizer. Here, the roll-shaped polarizing element has its absorption axis along the longitudinal direction. Thus, attachment of the light-transmitting substrate and the polarizing element by roll-to-roll processing enables to form a polarizer where the absorption axis of the polarizing element and the slow axis of the light-transmitting substrate are at right angle. Such an angle between the slow axis of the light-transmitting substrate and the absorption axis of the polarizing element will be mentioned later.

Appropriate adjustment of the stretching ratio, the stretching temperature, the thickness of a polyester substrate to be obtained, and the like enables to adjust the retardation of the polyester substrate produced by the above method to 3000 nm or higher. Specifically, a higher stretching ratio, a lower stretching temperature, and a greater thickness make it easy to provide a higher retardation. In contrast, a lower stretching ratio, a higher stretching temperature, and a smaller thickness make it easy to provide a lower retardation.

The polyester substrate is preferably 40 to 500 μm in thickness. The polyester substrate with a thickness of less than 40 μm may fail to have a retardation of 3000 nm or higher and may clearly have anisotropy of the mechanical characteristics. Thereby, the substrate may easily suffer rents, tears, or the like and may markedly deteriorate in the practicality as an industrial material. In contrast, the polyester substrate with a thickness exceeding 500 μm may disadvantageously be very rigid and may deteriorate in flexibility that is characteristic of polymeric films, thereby resulting in deterioration in the practicality as an industrial material. The lower limit of the thickness of the polyester substrate is more preferably 50 μm, whereas the upper limit thereof is more preferably 400 μm, and still more preferably 300 μm.

The polyester substrate preferably has a transmittance within the visible light region of 80% or higher, and more preferably 84% or higher. The transmittance can be measured in conformity with JIS K7361-1 (Plastics—Determination of the total luminous transmittance of transparent materials).

In the present invention, the polyester substrate may be surface-treated within the scope of the present invention. Examples of the surface treatment include saponification, glow discharge, corona discharge, ultraviolet (UV) treatment, and flame treatment.

The optical functional layer is preferably a hard coat layer having a hard coat property. The hard coat layer preferably has a hardness of H or higher, and more preferably 2H or higher, in conformity with a pencil hardness test (load: 4.9 N) in JIS K5600-5-4 (1999).

The hard coat layer is a layer that guarantees the hard coat property on the surface of the optical layered body of the present invention. For example, the hard coat layer is preferably formed from a composition for a hard coat layer containing an ionizing-radiation-curable resin, which is a resin curable by ultraviolet rays, and a photo-polymerization initiator.

Examples of the ionizing-radiation-curable resin used for the optical layered body of the present invention include compounds having one or two or more unsaturated bonds such as acrylic functional group-containing compounds. Examples of the compounds having one unsaturated bond include ethyl (meth)acrylate, ethylhexyl (meth)acrylate, styrene, methylstyrene, and N-vinylpyrrolidone. Examples of the compounds having two or more unsaturated bonds include polymethylolpropane tri(meth)acrylate, tripropylene glycol di(meth)acrylate, diethylene glycol di(meth)acrylate, pentaerythritol tri(meth)acrylate, pentaerythritol tetra(meth)acrylate, dipentaerythritol hexa(meth)acrylate, dipentaerythritol penta(meth)acrylate, 1,6-hexanediol di(meth)acrylate, and neopentyl glycol di(meth)acrylate; multi-functional compounds obtained by modifying any of the above compounds with ethylene oxide (EO); and reaction products between any of the multi-functional compounds and any of (meth)acrylates (e.g. poly(meth)acrylate esters of polyhydric alcohols). The term "(meth)acrylate" herein includes methacrylate and acrylate.

In addition to the above compounds, those having a relatively low molecular weight with an unsaturated double bond (number average molecular weight: 300 to 80,000, preferably 400 to 5,000), such as polyester resin, polyether resin, acrylic resin, epoxy resin, urethane resin, alkyd resin, spiroacetal resin, polybutadiene resin, and polythiol polyene resin, may be used as the ionizing-radiation-curable resin. The "resin" herein includes all of dimers, oligomers, and polymers, excluding monomers.

Examples of preferred compounds in the present invention include compounds having three or more unsaturated bonds. Such a compound enables to increase the cross-linking density of a hard coat layer and to provide a good coating hardness.

Specifically preferred in the present invention is appropriate combination of pentaerythritol triacrylate, pentaerythritol tetraacrylate, polyester multi-functional acrylate oligomers (3 to 15 functions), urethane multi-functional acrylate oligomers (3 to 15 functions), and the like.

The ionizing-radiation-curable resin may be used in combination with a solvent-drying-type resin. Combination use with a solvent-drying-type resin enables to effectively prevent defects of the coating. The "solvent-drying-type resin" herein means a resin which contains a solvent that is added upon application of the resin for adjustment of the solids content and which turns into a coating only by drying of the solvent. Examples of such a resin include thermoplastic resin.

The solvent-drying-type resin to be used in combination with the ionizing-radiation-curable resin is not particularly limited, and any thermoplastic resin may be used, in general.

The thermoplastic resin is not particularly limited. Examples thereof include styrenic resin, (meth)acrylic resin, vinyl acetate resin, vinyl ether resin, halogen-containing resin, alicyclic olefinic resin, polycarbonate resin, polyester resin, polyamide resin, cellulose derivatives, silicone resin, rubber, and elastomers. The thermoplastic resin is preferably amorphous and soluble in an organic solvent (especially, a common solvent which dissolves various polymers and curable compounds). Particularly preferred from the viewpoints of film formability, transparency, and weather resistance are styrenic resin, (meth)acrylic resin, alicyclic olefinic resin, polyester resin, and cellulose derivatives (e.g. cellulose esters).

The composition for a hard coat layer may contain a thermosetting resin.

The thermosetting resin is not particularly limited. Examples thereof include phenol resin, urea resin, diallyl phthalate resin, melamine resin, guanamine resin, unsaturated polyester resin, polyurethane resin, epoxy resin, aminoalkyd resin, melamine-urea co-condensed resin, silicon resin, and polysiloxane resin.

The photo-polymerization initiator is not particularly limited and known ones may be used. Specific examples of the photo-polymerization initiator include acetophenones, benzophenones, Michler's benzoyl benzoate, α-amyloxim ester, thioxanthones, propiophenones, benzils, benzoins, and acyl phosphine oxides. The initiator is preferably used in admixture with a photosensitizer. Specific examples thereof include n-butyl amine, triethyl amine, and poly-n-butyl phosphine.

For a resin having a radical polymerizable unsaturated group as the ionizing-radiation-curable resin, the photo-polymerization initiator is preferably one of acetophenones, benzophenones, thioxanthones, benzoin, and benzoin methyl ether, or a mixture thereof. For a resin having cation polymerizable functional group as the ionizing-radiation-curable resin, the photo-polymerization initiator is preferably one of aromatic diazonium salts, aromatic sulfonium salts, aromatic iodonium salts, metallocene compounds, and benzoin sulfonic ester, or a mixture thereof.

For the ionizing-radiation-curable resin having a radical polymerizable unsaturated group, the initiator used in the present invention is preferably 1-hydroxy-cyclohexyl-phenyl-ketone because this substance is well compatible with ionizing-radiation-curable resin and less causes yellowing.

The amount of the photo-polymerization initiator in the composition for a hard coat layer is preferably 1 to 10 parts by mass for 100 parts by mass of the ionizing-radiation-curable resin. If the amount thereof is less than 1 part by mass, the hard coat layer in the optical layered body of the present invention may fail to have a hardness within the aforementioned range. If the amount thereof is more than 10 parts by mass, ionizing radiation may not reach the depth of the formed film and may fail to urge internal curing. Thereby, the hard coat layer may fail to have a desired pencil hardness of 3H or higher on its surface.

The lower limit of the amount of the photo-polymerization initiator is more preferably 2 parts by mass, whereas the upper limit thereof is more preferably 8 parts by mass. The photo-polymerization initiator in an amount within this range enables to prevent hardness distribution in the thickness direction and to easily provide a uniform hardness.

The composition for a hard coat layer may contain a solvent.

The solvent to be used depends on the type and solubility of the resin component to be used. Examples thereof include ketones (e.g. acetone, methyl ethyl ketone, methyl isobutyl ketone, cyclohexanone, diacetone alcohol), ethers (e.g. dioxane, tetrahydrofuran, propylene glycol monomethyl ether, propylene glycol monomethyl ether acetate), aliphatic hydrocarbons (e.g. hexane), alicyclic hydrocarbons (e.g. cyclohexane), aromatic hydrocarbons (e.g. toluene, xylene), halogenated hydrocarbons (e.g. dichloromethane, dichloroethane), esters (e.g. methyl acetate, ethyl acetate, butyl acetate), water, alcohols (e.g. ethanol, isopropanol, butanol, cyclohexanol), cellosolves (e.g. methyl cellosolve, ethyl cellosolve), cellosolve acetates, sulfoxides (e.g. dimethyl sulfoxide), amides (e.g. dimethyl formamide, dimethyl acetamide). These solvents may also be used in admixture.

Particularly preferred in the present invention are ketone-type solvents, especially one of methyl ethyl ketone, methyl isobutyl ketone, and cyclohexanone or a mixture thereof because they are well compatible with resin and are easy to apply.

The proportion of the materials (solids content) in the composition for a hard coat layer is not particularly limited, and it is generally 5 to 70% by mass, and particularly preferably 25 to 60% by mass.

For the purposes of increasing the hardness of the hard coat layer, suppressing curing shrinkage, preventing blocking, adjusting the refractive index, imparting an anti-glare property, modifying the properties of the particles and the surface of hard coat layer, and the like, the composition for a hard coat layer may contain any of conventionally known organic and inorganic fine particles, dispersing agents, surfactants, antistatic agents, silane-coupling agents, thickening agents, anti-coloring agents, coloring agents (pigments, dyes), anti-foaming agents, leveling agents, flame retarders, ultraviolet absorbers, adhesion promoters, polymerization inhibitors, antioxidants, surface modifiers, and the like additives.

The composition for a hard coat layer may contain a photosensitizer. Specific examples thereof include n-butyl amine, triethyl amine, and poly-n-butyl phosphine.

The composition for a hard coat layer may be prepared by any method which allows the components to be uniformly mixed. The method may be one using any known device such as a paint shaker, a bead mill, a kneader, or a mixer.

The composition for a hard coat layer may be applied onto the light-transmitting substrate by any method. Examples of the method include known methods such as gravure coating, spin coating, dipping, spraying, die coating, bar coating, roll coating, meniscus coating, flexo printing, screen printing, and bead coating.

The film formed by application of the composition for a hard coat layer onto the light-transmitting substrate is preferably heated and/or dried as appropriate and then cured by, for example, irradiation of active energy rays.

The irradiation of active energy rays may be irradiation of ultraviolet rays or an electron beam. Specific examples of the source of ultraviolet rays include an ultra-high-pressure mercury lamp, a high-pressure mercury lamp, a low-pressure mercury lamp, a carbon arc lamp, a black light fluorescent lamp, and a metal halide lamp. The wavelength of the ultraviolet rays may be 190 to 380 nm. Specific examples of the source of an electron beam include various electron linear accelerators of Cockcroft-Walton type, Van de graaff type, resonant transformer type, insulated core transformer type, linear type, dynamitron type, and high-frequency type.

The thickness (after cured) of the hard coat layer is preferably 0.5 to 100 μm, and more preferably 0.8 to 20 μm. In order to achieve excellent properties of preventing curling and cracking, the thickness is most preferably 2 to 10 μm. The thickness of the hard coat layer is an average value (μm) of arbitrarily selected 10 points in the cross section observed through an electron microscope (SEM, TEM, STEM). The thickness of the hard coat layer may be determined by another method; that is, for example, arbitrarily selected 10 points are measured using a thickness measurement device (Digimatic Indicator IDF-130, Mitutoyo Corp.).

Blending an antistatic agent into the composition for a hard coat layer enables to impart an antistatic property to the hard coat layer.

The antistatic agent may be a conventionally known one. Examples thereof include cationic antistatic agents such as quaternary ammonium salts, fine particles such as tin-doped indium oxide (ITO) particles, and conductive polymers.

In the case of using the antistatic agent, The amount thereof is preferably 1 to 30% by mass for the total solids content.

The optical layered body of the present invention preferably further has a low refractive layer on the hard coat layer.

The low refractive layer is preferably formed from 1) resin containing low refractive inorganic fine particles such as silica or magnesium fluoride, 2) fluororesin which is a low refractive index resin, 3) fluororesin containing low refractive inorganic fine particles such as silica or magnesium fluoride, or 4) a low refractive inorganic thin film such as silica or magnesium fluoride. Resins other than the fluororesins may be the same as the aforementioned resins.

The silica is preferably hollow silica particles. Such hollow silica particles can be produced by the method disclosed in Examples of JP 2005-099778 A, for example.

The low refractive layer preferably has a refractive index of 1.47 or lower, and more preferably 1.42 or lower. The low refractive layer may have any thickness. In general, the thickness may be appropriately selected within about 10 nm to about 1 μm.

The fluororesin may be a polymerizable compound at least having a fluorine atom in its molecule or a polymer of such a compound. The polymerizable compound is not particularly limited, and it preferably has a curable group such as a functional group which cures with ionizing radiation or a thermosetting polar group. The polymerizable compound may have both of these reactive groups. In comparison with such a polymerizable compound, the polymer has no such reactive groups.

The polymerizable compound having an ionizing radiation-curable functional group may be a fluorine-containing monomer having an ethylenic unsaturated bond. Specific examples thereof include fluoroolefins (e.g. fluoroethylene, vinylidene fluoride, tetrafluoroethylene, hexafluoropropylene, perfluorobutadiene, perfluoro-2,2-dimethyl-1,3-dioxole). Examples of those having a (meth)acryloyloxy group include: (meth)acrylate compounds each having a fluorine atom in the molecule such as 2,2,2-trifluoroethyl (meth) acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethyl methacrylate, and α-trifluoroethyl methacrylate; and fluorine-containing multi-functional (meth)acrylate compounds each having a C1-C14 fluoroalkyl group, fluorocycloalkyl group, or fluoroalkylene group having at least three fluorine atoms and at least two (meth)acryloyloxy groups in the molecule.

The thermosetting polar group is preferably a hydrogen bond-formable group such as a hydroxy group, a carboxyl group, an amino group, or an epoxy group. These groups are excellent not only in adhesion with the coating but also in affinity with inorganic ultra-fine particles such as silica. Examples of the polymerizable compound having a thermosetting polar group include 4-fluoroethylene/perfluoroalkyl vinyl ether copolymers; fluoroethylene/hydrocarbon-type vinyl ether copolymers; and fluorine-modified products of resins such as epoxy, polyurethane, cellulose, phenol, and polyimide.

Examples of the polymerizable compound having both the ionizing radiation-curable functional group and the thermosetting polar group include partially or fully fluorinated alkyl, alkenyl, and aryl esters of acrylic or methacrylic acid, fully or partially fluorinated vinylethers, fully or partially fluorinated vinyl esters, and fully or partially fluorinated vinyl ketones.

Examples of the fluororesin include the following: polymers of monomers or monomer mixtures including at least one fluorine-containing (meth)acrylate compound which is a polymerizable compound having an ionizing radiation-curable group; copolymers of at least one fluorine-containing (meth)acrylate compound and a (meth)acrylate compound having no fluorine atom in its molecule (e.g. methyl (meth) acrylate, ethyl (meth)acrylate, propyl (meth)acrylate, butyl (meth)acrylate, 2-ethylhexyl (meth)acrylate); and monopolymers and copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene, and hexafluoropropylene. Silicone-containing vinylidene fluoride copolymers may also be used which are prepared by blending any of the above copolymers with a silicone component. Examples of the silicone component in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, and polyether-modified silicone. Preferable are those having a dimethylsiloxane structure.

The fluororesin may be a non-polymer or polymer formed from any of the following compounds. In other words, the fluororesin may be a compound obtained by reacting a fluorine-containing compound having at least one isocyanato group in its molecule and a compound having at least one functional group reactive with the isocyanato group (e.g. amino group, hydroxy group, carboxyl group) in its molecule; or a compound obtained by reacting a fluorine-containing polyol (e.g. fluorine-containing polyether polyol, fluorine-containing alkyl polyol, fluorine-containing polyester polyol, fluorine-containing ε-caprolactone-modified polyol) and a compound having an isocyanato group.

In addition to the above fluorine atom-containing polymerizable compounds and polymers, the aforementioned binder resin may be used in admixture. Further, a curing agent for curing, for example, the reactive groups and any additives and solvents for improving a coating property and for imparting an antifouling property may also be used.

The low refractive layer is preferably formed such that the composition for a low refractive layer which is formed from a low refractive index agent, resin, and the like components has a viscosity of 0.5 to 5 mPa·s (25° C.), and preferably 0.7 to 3 mPa·s (25° C.), for a favorable coating property. Such a configuration enables to provide an excellent antireflection layer against visible light, to form a uniform thin film without uneven application, and to form a low refractive layer especially with excellent adhesion.

The resin may be cured by the same method as the hard coat layer to be mentioned later. In the case of curing by heat application, the fluororesin composition preferably contains a thermal polymerization initiator which, for example, generates a radical by heating to initiate polymerization of a polymerizable compound.

The optical layered body of the present invention may be produced as follows. For example, the polyester substrate prepared by the above method is covered by a coating for a hard coat layer; the coating is dried if necessary; and then the coating for a hard coat layer is cured to form a hard coat layer. Subsequently, the low refractive layer is formed on the hard coat layer by a known method as appropriate. This provides the optical layered body of the present invention.

The coating for a hard coat layer may be dried by any method. In general, the coating is preferably dried at 30° C. to 120° C. for 3 to 120 seconds.

The method for curing the coating for a hard coat layer may be any known method appropriately selected depending on the constitutional components. For example, a coating containing an ultraviolet-curable binder resin component is cured by ultraviolet radiation onto the coating.

The ultraviolet radiation is preferably such that the ultraviolet radiation dose is 80 mJ/cm$^2$ or higher, more preferably 100 mJ/cm$^2$ or higher, and still more preferably 130 mJ/cm$^2$ or higher.

The optical layered body of the present invention preferably has a primer layer between the light-transmitting substrate and the optical functional layer.

The primer layer is disposed for the primary purpose of improving the adhesion between the polyester substrate and the hard coat layer. In order to prevent interference fringes due to formation of the primer layer, the thickness of the primer layer is preferably appropriately selected as follows on the basis of the relationship among the refractive indexes (nx and ny) of the light-transmitting substrate, the refractive index (nf) of the optical functional layer, and the refractive index (np) of the primer layer:

(1) the thickness of the primer layer is preferably 3 to 30 nm, provided that the refractive index (np) of the primer layer is greater than the refractive index (nx) in the slow axis direction of the light-transmitting substrate and is greater than the refractive index (nf) of the optical functional layer (np>nx and np>nf) or that the refractive index (np) of the primer layer is smaller than the refractive index (ny) in the fast axis direction of the light-transmitting substrate and is smaller than the refractive index (nf) of the optical functional layer (np<ny and np<nf);

(2) the thickness of the primer layer is preferably 65 to 125 nm, provided that the refractive index (np) of the primer layer is greater than the refractive index (nx) in the slow axis direction of the light-transmitting substrate but is smaller than the refractive index (nf) of the optical functional layer (nx<np<nf) or that the refractive index (np) of the primer layer is smaller than the refractive index (ny) in the fast axis direction of the light-transmitting substrate but is greater than the refractive index (nf) of the optical functional layer (nf<np<ny); or (3) the thickness of the primer layer is not particularly limited from the viewpoint of preventing interference fringes provided that the refractive index (np) of the primer layer is between the refractive index (ny) in the fast axis direction of the light-transmitting substrate and the refractive index (nx) in the slow axis direction of the light-transmitting substrate (ny<np<nx). In order to decrease the amount of light reflected on the interface between the primer layer and the light-transmitting substrate to weaken interference fringes, the refractive index (np) of the primer layer is preferably as close to the value of (nx+ny)/2 as possible.

The following will describe the reason why the above thicknesses of the primer layers in the situations (1) and (2) are preferred. In the situation (1), the interface (interface A) between the primer layer and the optical functional layer and the interface (interface B) between the light-transmitting substrate and the primer layer show opposite relationship about the degree of change in the refractive index against incident natural light. Thus, the natural light reflected on one of the interface A and the interface B shows free-end reflection, whereas that on the other interface shows fixed-end reflection; that is, the phases are reversed. As a result, a thin primer layer allows the light beams reflected on the respective interfaces to interfere with each other, thereby decreasing their intensities.

In the situation (2), the interface A and the interface B show the same degree of change in the refractive index and thus the light beams reflected on the interface A and the interface B have the same phase. Thus, the primer layer with an optical thickness of ¼ the light wavelength allows the light beams reflected on the respective interfaces to interfere with each other, thereby decreasing their intensities. Since the refractive index of the primer layer is generally about 1.47 to about 1.63 as will be mentioned later, the thickness of the primer layer in the situation (2) is a value calculated on the basis of the refractive index of 1.55, which is the intermediate value between the above range, and a light wavelength of 380 to 780 nm.

In the case where the difference in refractive index between the primer layer and the light-transmitting substrate is identical to the difference in refractive index between the primer layer and the optical functional layer, the reflectances on the respective interfaces are also identical to each other, showing the best effects owing to the interference in the situations (1) and (2).

The primer layer is preferably 3 to 30 nm in the situation (1). The primer layer with a thickness of lower than 3 nm may provide insufficient adhesion between the polyester substrate and the hard coat layer. The primer layer with a thickness exceeding 30 nm may provide an insufficient property of preventing interference fringes on the optical layered body of the present invention. The lower limit of the thickness of the primer layer in the situation (1) is more preferably 10 nm, whereas the upper limit thereof is more preferably 20 nm.

The primer layer is preferably 65 to 125 nm in thickness in the situation (2). The primer layer with a thickness beyond this range may provide an insufficient property of preventing interference fringes on the optical layered body of the present invention. The lower limit of the thickness of the primer layer in the situation (2) is more preferably 70 nm, whereas the upper limit thereof is more preferably 110 nm.

The primer layer may have any thickness without limitation in the situation (3). The lower limit of the thickness is preferably 3 nm, whereas the upper limit thereof is preferably 125 nm.

The thickness of the primer layer is an average value (nm) of, for example, arbitrarily selected 10 points in the cross section observed through an electron microscope (SEM, TEM, STEM). For a very thin primer layer, the cross section observed at a high magnification is recorded as a picture and this picture is further magnified to measure the thickness. The magnification turns a layer-interface line, which is very thin enough to clarify the boundary line, into a thick one. In this case, the width of this thick line is bisected and the center portion crossing the width serves as the boundary line for the measurement.

The material of such a primer layer is not particularly limited as long as it has adhesiveness with the light-transmitting substrate. The material may be one conventionally used as a primer layer of an optical layered body.

In consideration of conventional materials of a primer layer for a conventional optical layered body, those satisfying favorable adhesiveness and hardness provide a primer layer with a refractive index of 1.47 to 1.63. In comparison with the case where the thickness of the primer layer is not adjusted, the optical layered body of the present invention favorably makes it possible to select the material of the primer layer within a very wide range of materials.

For the refractive index (nf) of the optical functional layer in the situations (1) and (2), the difference in refractive index between the primer layer and the light-transmitting substrate is preferably as close to the difference in refractive index between the primer layer and the optical functional layer as possible for the best effects owing to the interference. In the situation (3), the refractive index (nf) is preferably as close to the refractive index of the primer layer as possible for prevention of an increase in the interface.

The primer layer in the optical layered body of the present invention may be formed from a composition for a primer layer. The composition for a primer layer is prepared by mixing and dispersing the aforementioned materials and, if necessary, a photo-polymerization initiator and other components in a solvent.

The mixing and dispersing may be preferably achieved using a known device such as a paint shaker, a bead mill, or a kneader.

The solvent is preferably water, and the composition for a primer is preferably used in the form of an aqueous coating liquid such as an aqueous solution, an aqueous dispersion, or an emulsion. A small amount of an organic solvent may also be used together.

Examples of the organic solvent include: alcohols (e.g. methanol, ethanol, propanol, isopropanol, n-butanol, s-butanol, t-butanol, benzyl alcohol, PGME, ethylene glycol); ketones (e.g. acetone, methyl ethyl ketone, methyl isobutyl ketone, cyclopentanone, cyclohexanone, heptanone, diisobutyl ketone, diethyl ketone); aliphatic hydrocarbons (e.g. hexane, cyclohexane); halogenated hydrocarbons (e.g. methylene chloride, chloroform, carbon tetrachloride); aromatic hydrocarbons (e.g. benzene, toluene, xylene); amides (e.g. dimethyl formamide, dimethyl acetamide, n-methylpyrrolidone); ethers (e.g. diethyl ether, dioxane, tetrahydrofuran); ether alcohols (e.g. 1-methoxy-2-propanol); and esters (e.g. methyl acetate, ethyl acetate, butyl acetate, isopropyl acetate).

The other components are not particularly limited. Examples thereof include leveling agents, organic and inorganic fine particles, photo-polymerization initiators, thermal polymerization initiators, cross-linking agents, curing agents, polymerization accelerators, viscosity modifiers, antistatic agents, antioxidants, antifouling agents, slipping agents, refractive index modifiers, and dispersing agents.

The composition for a primer layer preferably satisfies a total solids content of 3 to 20%. A total solids content of less than 3% may cause remaining of the solvent and whitening. A total solids content exceeding 20% may cause the composition for a primer layer to have a high viscosity and a poor coating property. Thereby, the coating may suffer unevenness or stripes on its surface and may fail to achieve a desired thickness. The solids content is more preferably 4 to 10%.

The composition for a primer layer may be applied onto the polyester substrate at any stage of the process. It is preferably applied during the production of the polyester substrate, and more preferably applied onto the polyester substrate before oriented crystallization.

The "polyester substrate before oriented crystallization" includes unstretched films, monoaxially oriented films prepared by orienting the unstretched film along the machine direction or the transverse direction, films oriented along the two direction, the machine direction and the transverse direction, at a low stretching ratio (biaxially stretched film before completion of the oriented crystallization by re-stretching along the machine direction and the transverse direction), and the like. In particular, it is preferable to apply an aqueous coating liquid of the composition for a primer layer onto an unstretched film or a uniaxially stretched film that is oriented along one direction and then perform machine direction stretching and/or transverse direction stretching and heat fixing.

The application of the composition for a primer layer onto the polyester substrate preferably follows a preliminary treatment on the surface of the polyester substrate for improving the coating property, such as physical treatments including corona treatment, flame treatment, and plasma treatment. Alternatively, the composition for a primer layer is preferably used with a surfactant that is chemically inactive with the composition.

The composition for a primer layer may be applied by any known application method. Examples thereof include roll coating, gravure coating, roll brushing, spray coating, air knife coating, immersion, and curtain coating. These techniques may be performed alone or in combination. The film may be formed on one side of the polyester substrate or on both sides thereof as appropriate.

As mentioned above, the primer layer having a refractive index and a thickness each within the above specific range enables to exert its effect of preventing interference fringes.

Such a primer layer and hard coat layer whose refractive indexes satisfy the specific relationship are each preferably formed from a composition that has an adjusted refractive index prepared by blending the composition for a hard coat layer or the composition for a primer layer containing high refractive fine particles and/or low refractive fine particles.

The high refractive fine particles may suitably be metal oxide fine particles whose refractive index is 1.50 to 2.80, for example. Specific examples of the metal oxide fine particles include titanium oxide ($TiO_2$, refractive index: 2.71), zirconium oxide ($ZrO_2$, refractive index: 2.10), cerium oxide ($CeO_2$, refractive index: 2.20), tin dioxide ($SnO_2$, refractive index: 2.00), antimony tin oxide (ATO, refractive index: 1.75 to 1.95), indium tin oxide (ITO, refractive index: 1.95 to 2.00), phosphorus tin oxide (PTO, refractive index: 1.75 to 1.85), antimony pentoxide ($Sb_2O_5$, refractive index: 2.04), aluminum zinc oxide (AZO, refractive index: 1.90 to 2.00), gallium zinc oxide (GZO, refractive index: 1.90 to 2.00), and zinc antimonate ($ZnSb_2O_6$, refractive index: 1.90 to 2.00). In particular, tin dioxide ($SnO_2$), antimony tin oxide (ATO), indium tin oxide (ITO), phosphorus tin compound (PTO), antimony pentoxide ($Sb_2O_5$), aluminum zinc oxide (AZO), gallium zinc oxide (GZO), and zinc antimonate ($ZnSb_2O_6$) are advantageous in that they are conductive metal oxides, and enable to control the state of dispersion of fine particles and form a conductive path to impart antistatic properties.

The low refractive fine particles may suitably be those having a refractive index of 1.20 to 1.45. Such low refractive fine particles may be fine particles used for a conventionally known low refractive layer, and examples thereof include the aforementioned hollow silica particles and fine particles of metal fluoride such as LiF (refractive index: 1.39), $MgF_2$ (magnesium fluoride, refractive index: 1.38), $AlF_3$ (refractive index: 1.38), $Na_3AlF_6$ (cryolite, refractive index: 1.33), and $NaMgF_3$ (refractive index: 1.36).

The amounts of the high refractive fine particles and the low refractive fine particles are not particularly limited. For example, the amounts thereof may be appropriately adjusted such that the refractive index of a hard coat layer to be formed satisfies the aforementioned relationship in terms of a weighted mean with a previously measured refractive index of cured products of the resin components added to the composition for a hard coat layer.

The hard coat layer may be completed as follows: applying the composition for a hard coat layer onto the primer layer formed by the above method to form a coating for a hard coat layer; if necessary, drying the coating; and then curing the coating for a hard coat layer.

In the case where the composition for a hard coat layer contains an ultraviolet-curable resin, the composition for a primer layer may contain an initiator used for curing the coating for a hard coat layer so as to assure further adhesion between the hard coat layer and the primer layer.

The optical layered body of the present invention preferably has a hardness of HB or higher, and more preferably H or higher in the pencil hardness test (load: 4.9 N) in conformity with JIS K5600-5-4 (1999).

The optical layered body of the present invention preferably has a total luminous transmittance of 80% or higher. The optical layered body with a total luminous transmittance of lower than 80% may deteriorate color reproducibility and visibility when attached to an image display device, and may fail to provide a desired contrast. The total luminous transmittance is more preferably 90% or higher.

The total luminous transmittance can be measured using a haze meter (MURAKAMI COLOR RESEARCH LABORATORY CO, Ltd., product No.: HM-150) by the method in conformity with JIS K7361.

The optical layered body of the present invention preferably has a haze of 1% or lower. The optical layered body with a haze exceeding 1% may fail to provide desired optical characteristics and may deteriorate visibility when attached to the image display device.

The haze can be measured using a haze meter (MURAKAMI COLOR RESEARCH LABORATORY CO, Ltd., product No.: HM-150) by the method in conformity with JIS K7136.

In the case where the optical functional layer is a hard coat layer, the optical layered body of the present invention may be produced by, for example, forming a hard coat layer from the composition for a hard coat layer on the light-transmitting substrate. In the case where the optical functional layer has a low refractive layer disposed on the hard coat layer, the optical layered body of the present invention may be produced by, for example, forming a hard coat layer from the composition for a hard coat layer on the light-transmitting substrate, and then forming a low refractive layer from the composition for a low refractive layer on the hard coat layer.

The composition for a hard coat layer, the method for forming a hard coat layer, the composition for a low refractive layer, and the method for forming a low refractive layer may be the same materials and the methods as mentioned above.

Another aspect of the present invention relates to a polarizer that is configured to be disposed on a surface of an image display device, the polarizer comprising: a polarizing element; and an optical layered body disposed on the polarizing element, the optical layered body including a light-transmitting substrate having in-plane birefringence and an optical functional layer disposed on one surface of the light-transmitting substrate, the light-transmitting substrate having a slow axis with a greater refractive index and the polarizing element having an absorption axis, the light-transmitting substrate and the polarizing element being disposed such that the slow axis of the light-transmitting substrate and the absorption axis of the polarizing element are orthogonal to each other, and the polarizer being configured to be disposed on a display screen of the image display device such that the slow axis of the light-transmitting substrate is in parallel with the vertical direction of the display screen.

The optical layered body in the polarizer of the present invention may be the same as the optical layered body of the present invention.

For the same reasons as in the optical layered body of the present invention, the polarizer of the present invention preferably satisfies that the light-transmitting substrate having in-plane birefringence has a retardation of 3000 nm or greater and that the difference (nx-ny) is 0.05 or greater, where nx represents the refractive index in the slow axis direction, which is the direction showing a greater refractive index, and ny represents the refractive index in the fast axis direction that is orthogonal to the slow axis direction.

For the same reasons as in the optical layered body of the present invention, the polarizer of the present invention preferably has a primer layer between the light-transmitting substrate and the optical functional layer and the primer layer preferably has a thickness appropriately selected in accordance with the above situations (1) to (3).

The polarizing element is not particularly limited. Examples thereof include polyvinyl alcohol films, polyvinyl formal films, polyvinyl acetal films, and ethylene/vinyl acetate copolymerized saponified films, each of which are dyed using, for example, iodine and then stretched. The lamination treatment of the polarizing element and the optical layered body preferably include a step of saponifying the light-transmitting substrate. The saponification provides good adhesion and antistatic effects.

The polarizer of the present invention satisfies that the light-transmitting substrate and the polarizing element are disposed such that the slow axis extending along the direction showing a greater refractive index of the light-transmitting substrate is orthogonal to the absorption axis of the polarizing element. Since the polarizer of the present invention satisfies that the light-transmitting substrate and the polarizing element are disposed as mentioned above and disposed such that the slow axis extending along the direction showing a greater refractive index of the light-transmitting substrate is in parallel with the vertical direction of a display screen of the image display device, the polarizer is excellent in anti-reflection properties and bright-field contrast similarly to the aforementioned optical layered body of the present invention.

The phrase "the light-transmitting substrate and the polarizing element are disposed such that the slow axis extending along the direction showing a greater refractive index of the light-transmitting substrate is orthogonal to the absorption axis of the polarizing element" means the state that the light-transmitting substrate and the polarizing element are disposed such that the angle formed between the slow axis of the light-transmitting substrate and the absorption axis of the polarizing element is within 90°±40°.

The polarizer of the present invention preferably satisfies that the angle between the slow axis of the light-transmitting substrate and the absorption axis of the polarizing element is 90°±30°, more preferably 90°±10°, and still more preferably 90°±5°. The polarizer of the present invention with an angle between the slow axis of the light-transmitting substrate and the absorption axis of the polarizing element of 90°±40° enables to improve the anti-reflection properties and the bright-field contrast. The angle between the slow axis of the light-transmitting substrate and the absorption axis of the polarizing element in the polarizer of the present invention is most preferably 90° for the purpose of improving the anti-reflection properties and the bright-field contrast. Thus, the angle between the slow axis of the light-transmitting substrate and the absorption axis of the polarizing element is preferably not 90°±40° but 90°±30°, and more preferably 90°±10°. Further, the angle between the slow axis of the light-transmitting substrate and the absorption axis of the polarizing element is still more preferably 0°±5° because such an angle enables to raise the anti-reflection properties and the bright-field contrast to the same levels as the angle of 0°.

Such a polarizer of the present invention may be produced by disposing the light-transmitting substrate of the optical layered body and the polarizing element such that the slow axis extending along the direction showing a greater refractive index of the light-transmitting substrate is orthogonal to the absorption axis of the polarizing element. In this case, the slow axis extending along the direction showing a greater refractive index of the light-transmitting substrate is in parallel with the vertical direction of a display screen of the image display device.

Another aspect of the present invention relates to an image display device comprising the optical layered body of the present invention or the polarizer of the present invention.

The image display device of the present invention may be any of image display devices such as LCDs, PDPs, FEDs, ELDs (organic ELDs, inorganic ELDs), CRTs, tablet PCs, touchscreens, and electronic paper.

An LCD, which is one representative example of the above image display devices, comprises a transmissive display and a light source device that irradiates the transmissive display from the back side. The image display device of the present invention which is an LCD comprises the transmissive display and the optical layered body of the present invention or the polarizer of the present invention disposed on the surface of the transmissive display.

In the case where the image display device of the present invention is a liquid crystal display device comprising the optical layered body of the present invention or the polarizer of the present invention, the light source device illuminates the optical layered body of the present invention or the polarizer of the present invention from the lower side. A retardation film may be disposed between the liquid crystal display element and the polarizer of the present invention. This liquid crystal display device may have an adhesive layer between the respective layers, if necessary.

The PDP comprises a front glass substrate having an electrode on its surface and a back glass substrate that is opposite to the front glass substrate and that has an electrode and minute grooves on its surface, wherein a discharge gas is filled into the space between the glass substrates, and the grooves each have a red, green, or blue fluorescent layer. The image display device of the present invention which is a PDP comprises the optical layered body of the present invention on the surface of the front glass substrate or a substrate (glass substrate or a film substrate) disposed in front of the front glass substrate.

The image display device of the present invention may be, for example, an ELD device that comprises a glass substrate and luminous bodies (e.g. zinc sulfide, diamine substances), which emit light when a voltage is applied, deposited on the glass substrate and that shows an image by controlling the voltage to be applied onto the substrate, or a CRT that converts electric signals into light to show an image visible to the human eyes. In this case, the display device has the above optical layered body of the present invention on the outermost surface or on the surface of a substrate in front of the outermost surface of the display device.

In the case where the image display device of the present invention is a liquid crystal display device having the optical layered body, the backlight light source of the liquid crystal display device is not particularly limited, and is preferably a white-light-emitting diode (white LED). The image display device of the present invention is preferably a VA-mode or IPS-mode liquid crystal display device comprising a white-light-emitting diode as a backlight light source.

The white LED is a white-color-emitting element which is of a fluorescent substance type, in other words, which comprises a blue- or ultraviolet-light-emitting diode using a compound semiconductor and a fluorescent substance in combination. In particular, a white-light-emitting diode of a light-emitting element that comprises a blue-light-emitting diode utilizing a compound semiconductor and a yttrium/aluminum/garnet-type yellow fluorescent substance in combination has a continuous and wide emission spectrum so that it is effective to improve the anti-reflection properties and the bright-field contrast. Further, such a diode is excellent in luminous efficacy. Thus, such a white-light-emitting diode is suitable as the backlight light source in the present invention. In addition, a white LED with a low electric energy consumption can be widely used, and thus the effect of low energy consumption can be achieved.

The VA (vertical alignment) mode is an operation mode in which the liquid crystal molecules are aligned perpendicular to the substrate of the liquid crystal cell With no voltage application to display a dark screen, whereas the liquid crystal molecules are tilted with voltage application to show a bright screen.

The IPS (in-plane switching) mode is a mode in which one substrate of the liquid crystal cell has a comb-shaped electrode pair and a transverse electric field applied to the electrode pair rotates the liquid crystal in the substrate plane to show an image.

The following will describe the reasons why the image display device comprising the optical layered body or polarizer of the present invention is preferably a VA mode or IPS mode display device with a white-light-emitting diode as the backlight light source.

The image display device of the present invention is capable of reducing reflection of light beams vibrating along the horizontal direction (S-polarized light), which occupy a large proportion of the light incident on the display screen, on the optical layered body or the polarizer of the present invention. As a result, many S-polarized light beams pass through the screen. Such S-polarized light passed is generally absorbed in the display device, but slight part of the light returns to an observer. In the VA mode or IPS mode display device, the polarizer is disposed closer to the observer than the liquid crystal cell and it has an absorption axis extending in the horizontal direction relative to the display screen. Thus, the polarizer enables to absorb the S-polarized light which has passed through the optical layered body or polarizer of the present invention, and thereby to reduce the light returning to the observer.

The image display device of the present invention may be an organic EL display device comprising a polarizing element disposed on a display screen such that the absorption axis of the polarizing element extends in the horizontal direction relative to the display screen. The organic EL display device requires no polarizing element based on its image displaying principle. Nevertheless, in order to prevent natural light reflection, the device may have a layered structure of a polarizing element, a λ/4 retardation film, and an organic EL element from the observer side. In this case, the polarizing element and the λ/4 retardation film each serve as a circular polarizer for preventing natural light reflection. Here, a common λ/4 retardation film serves as a λ/4 retardation film against only a specific wavelength, and thus it cannot prevent reflection of all the light beams incident on the display. Thus, the absorption axis of the polarizing element extending in the horizontal direction relative to the display screen enables to absorb the S-polarized light entering the display screen and reduce the light entering the inside of the image, and thereby reduce the light returning to the observer.

The organic EL display device may employ any of the image display modes such as a color filter mode in which a white luminous layer is used and the light passes through a color filter to achieve colored screen; a color conversion mode in which a blue luminous layer is used and part of the light passes through a color-conversion layer to achieve colored screen; a three-color mode in which red, green, and blue luminous layers are used; and a combination of this three-color mode with a color filter. The material of each luminous layer may be a low-molecular-weight molecule or may be a high-molecular-weight molecule.

In either case, the image display device of the present invention may be used for image displaying on televisions, computers, electronic paper, touchscreens, tablet PC, and the like. In particular, the image display device of the present invention may be suitably used for any displays for high-definition images such as CRTs, liquid crystal panels, PDPs, ELDs, FEDs, and touchscreens.

Another aspect of the present invention relates to a method for producing an image display device that has an optical layered body including a light-transmitting substrate having in-plane birefringence and an optical functional layer disposed on one surface of the substrate.

In other words, the method for producing an image display device of the present invention is a method for producing an image display device that has an optical layered body including a light-transmitting substrate having in-plane birefringence and an optical functional layer disposed on one surface of the substrate. The method comprises the step of disposing the optical layered body such that the slow axis extending along the direction showing a greater refractive index of the light-transmitting substrate is in parallel with the vertical direction of a display screen of the image display device.

The optical layered body in the method for producing an image display device of the present invention may be the same as the aforementioned optical layered body of the present invention.

The phrase "disposing the optical layered body such that the slow axis extending along the direction showing a greater refractive index of the light-transmitting substrate is in parallel with the vertical direction of a display screen of the image display device" means that the optical layered body is disposed such that the angle between the slow axis and the vertical direction of the display screen is within 0°±40°.

As is mentioned for the optical layered body of the present invention, the angle between the slow axis of the light-transmitting substrate and the vertical direction of the display screen is preferably 0°±30°, more preferably 0°±10°, and still more preferably 0°±5°.

The aforementioned image display device of the present invention is excellent in anti-reflection properties and bright-field contrast, and has improved visibility. Such a method for improving visibility by the image display device of the present invention is also one aspect of the present invention.

In other words, the method for improving visibility of an image display device of the present invention is a method for improving visibility of an image display device that has an optical layered body including a light-transmitting substrate having in-plane birefringence and an optical functional layer disposed on one surface of the substrate. The method comprises the step of disposing the optical layered body such that the slow axis extending along the direction showing a greater refractive index of the light-transmitting substrate is in parallel with the vertical direction of a display screen of the image display device.

The optical layered body in the method for improving visibility of an image display device of the present invention may be the same as the aforementioned optical layered body of the present invention. The image display device therein may be the same as the aforementioned image display device of the present invention.

The phrase "disposing the optical layered body such that the slow axis extending along the direction showing a greater refractive index of the light-transmitting substrate is in parallel with the vertical direction of a display screen of the image display device" means that the optical layered body is disposed such that the angle between the slow axis and the vertical direction of a display screen is within 0°±40°.

As is mentioned for the polarizer of the present invention, the angle between the slow axis of the light-transmitting substrate and the vertical direction of a display screen is preferably 0°±30°, more preferably 0°±10°, and still more preferably 0°±5°.

Advantageous Effects of Invention

Since the optical layered body and polarizer of the present invention have the aforementioned structures, even a light-transmitting substrate having in-plane birefringence such as a polyester film can contribute to production of an image display device excellent in anti-reflection properties and bright-field contrast.

Thus, the optical layered body and polarizer of the present invention can be suitably used for cathode ray tube display devices (CRTs), liquid crystal displays (LCDs), plasma display panels (FDPs), electroluminescence displays (ELDs), field emission displays (FEDs), electronic paper, touchscreens, tablet PCs, and the like.

BRIEF DESCRIPTION OF THE DRAWINGS

FIG. 1 is a graph showing the spectrum of a backlight light source of a liquid crystal monitor used in, for example, the following examples.

DESCRIPTION OF EMBODIMENTS

Evaluation of Bright-Field Contrast

An optical layered body was disposed on a polarizing element of a liquid crystal monitor (FLATORON IPS226V (LG Electronics Japan)) at the observer side such that the optical functional layer was at the observer side so that the S-polarized light and the fast axis of the light-transmitting substrate showed the same relationship as in the reflectance measurement. The bright-field contrast of the display screen was visually observed at an ambient illumination intensity of 400 lx (in the bright field). Specifically, the bright-field contrast is represented by the following formula, and generally the rate of change in bright-field white luminance is low but the rate of change in bright-field black luminance is high. Thus, the bright-field black luminance has an influence on the bright-field contrast. Further, the intrinsic black luminance of a panel is smaller than the bright-field black luminance and thus is eliminated. Accordingly, the blackness (bright-field black luminance) was evaluated as follows and this evaluation was substantially defined as the evaluation on the bright-field contrast.

Two liquid crystal monitors were prepared with different angles between the S-polarized light and the fast axis of the light-transmitting substrate (one is referred to as a liquid crystal monitor A and the other as a liquid crystal monitor B). The liquid crystal monitors A and B were placed side by side, and were subjected to a sensory test by 15 subjects (the subjects observed the liquid crystal monitors with a black screen from the position apart from the display by 50 to 60 cm and evaluated which screen was blacker). The liquid crystal monitor that 12 or more subjects evaluated blacker was evaluated as good in bright-field contrast, whereas the monitor that less than 12 subjects, in other words, 11 or less subjects evaluated blacker was evaluated as poor. The angles of disposing the optical layered bodies on the liquid crystal monitors A and B were appropriately adjusted for evaluation in the respective examples and comparative examples. The monitor that 13 or more subjects evaluated blacker was evaluated as particularly better.

Bright-field contrast: $CR=LW/LB$

Bright-field white luminance (LW): luminance of white screen on display device in bright field with natural light (ambient illumination intensity 400 lx)

Bright-field black luminance (LB): luminance of black screen on display device in bright field with natural light (ambient illumination intensity 400 lx)

(Measurement of Reflectance)

A black plastic tape (Yamato Vinyl Tape No200-38-21, 38 mm width) was attached onto the measurement side, that is, the side opposite to the optical functional layer, of the optical layered body. The 5-degree reflectance was measured for each case where the slow axis of the light-transmitting substrate was in parallel with the S-polarized light and the case where the fast axis was in parallel therewith (polarized light measurement) using a spectrophotometer (automatic absolute reflectance measurement unit V7100-series, VAR-7010, JASCO Corp.).

(Evaluation of Rainbow Interference Pattern)

In each of the examples, comparative examples, and reference examples, an observer observed visually and through polarized sunglasses an image that was displayed on the liquid crystal monitor provided with an optical layered body for the aforementioned evaluation of the bright-field contrast from the front and a diagonal direction (about) 50° at the position apart from the monitor by 50 to 60 cm. Thereby, a rainbow interference pattern was evaluated.

FIG. 1 shows a spectrum of the backlight light source of the liquid crystal monitor used.

(Measurement of Retardation)

The retardation of the light-transmitting substrate was measured as follows.

For a stretched light-transmitting substrate, the direction of the polarization axis of the light-transmitting substrate was measured using two polarizers. The refractive indexes (nx and ny) against the wavelength of 590 nm of the two axes orthogonal to the polarization axis were measured using an Abbe refractometer (NAR-4T, ATAGO CO., LTD.). The axis that shows a greater refractive index was defined as the slow axis. The thickness d (nm) of the light-transmitting substrate was measured using an electric micrometer (ANRITSU CORP.) and its unit was converted into nanometer. The product between the difference in refractive indexes (nx−ny) and the film thickness d (nm) provided the retardation.

(Measurement of Refractive Index)

The refractive index was measured using an ellipsometer (UVISEL, HORIBA, Ltd.).

(Confirmation of In-Plane Birefringence)

The presence of in-plane birefringence was confirmed as follows. The in-plane phase difference was measured using KOBRA-WR (Oji Scientific Instruments) at a measurement angle of 0° and a measurement wavelength of 589.3 nm. The in-plane phase difference of less than 20 nm was defined as the absence of in-plane birefringence, whereas the in-plane phase difference of 20 nm or higher was defined as the presence of in-plane birefringence.

Example 1, Comparative Example 1

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C., stretched at a stretching ratio of 4.5 times and 120° C. in a first direction, and then stretched at a stretching ratio of 1.5 times and 120° C. in the direction orthogonal to the first stretching direction using a biaxial stretching tester (Toyo Seiki Seisaku-sho, Ltd.). This yielded a light-transmitting substrate (nx=1.70, ny=1.60, (nx−ny)=0.10, thickness=80 μm, retardation=8000 nm).

Next, pentaerythritol triacrylate (PETA) was dissolved in an MIBK solvent at 30% by mass and then the solution was mixed with a photo-polymerization initiator (Irg 184, BASF) so as to be 5% by mass for the solids content in the solution, thereby preparing a composition for an optical functional layer. The composition was applied on the substrate using a bar coater so as to give a thickness after dried of 5 μm, thereby producing a coating as an optical functional layer.

The produced coating was heated for one minute at 70° C. to remove the solvent. The coat surface was cured by irradiation with ultraviolet rays. This yielded an optical layered body comprising an optical functional layer with a refractive index (nf) of 1.53. In Example 1, the optical layered body was disposed such that the S-polarized light was in parallel with the fast axis of the light-transmitting substrate (the angle between the S-polarized light and the fast axis of the light-transmitting substrate was 0°), and the reflectance in this case was 4.45%. In Comparative Example 1, the optical layered body was disposed such that the S-polarized light was in parallel with the slow axis of the light-transmitting substrate (the angle between the S-polarized light and the fast axis of the light-transmitting substrate was 90°), and the reflectance in this case was 4.73%. Therefore, the optical layered body of Example 1 was better in anti-reflection properties.

In order to provide the same relationship between the S-polarized light and the fast axis of the light-transmitting substrate as in the reflectance measurement, the optical layered body was disposed on the polarizing element of a liquid crystal monitor (FLATORON IPS226V (LG Electronics Japan)) at the observer side such that the optical functional layer was at the observer side. The bright-field contrast of the display screen was visually evaluated at an ambient illumination intensity of 400 lx (bright field).

Example 1 evaluated the values in the state that the S-polarized light vibrating in the horizontal direction relative to the display screen, which occupied a greater part of the light incident on the display screen, is in parallel with the fast axis of the light-transmitting substrate (the slow axis of the light-transmitting substrate is in parallel with the vertical direction of the display screen, in other words, the angle between the slow axis of the light-transmitting substrate and the vertical direction of a display screen was 0°). Comparative Example 1 evaluated the values in the state that the S-polarized light was in parallel with the slow axis of the light-transmitting substrate (the angle between the slow axis of the light-transmitting substrate and the vertical direction of a display screen was 90°). As a result, the liquid crystal monitor A using the optical layered body of Example 1 was particularly better in bright-field contrast of the display screen than the liquid crystal monitor B of the optical layered body of Comparative Example 1. The liquid crystal monitor A using the optical layered body of Example 1 showed no rainbow interference pattern and the visibility was very well improved. In contrast, the liquid crystal monitor B using the optical layered body of Comparative Example 1 showed no rainbow interference pattern but was poorer in bright-field contrast and anti-reflection properties than the liquid crystal monitor A using the optical layered body of Example 1.

Example 2, Comparative Example 2

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C., stretched at a stretching ratio of 4.5 times and 120° C. in a first direction, and then stretched at a stretching ratio of 1.8 times and 120° C. in the direction orthogonal to the first stretching direction using a' biaxial stretching tester (Toyo Seiki Seisaku-sho, Ltd.). This yielded a light-transmitting substrate (nx=1.68, ny=1.62, (nx−ny)=0.06, thickness=80 μm, retardation=4800 nm).

Except for the obtained light-transmitting substrate was used, an optical layered body comprising an optical functional layer with a refractive index (nf) of 1.53 was obtained in the same manner as in Example 1. Using the obtained optical layered body, the reflectance was measured and the bright-field contrast was evaluated in the same manner as in Example 1 (the angle between the S-polarized light and the fast axis of the light-transmitting substrate was 0°). As a result, the reflectance of the optical layered body of Example 2 was 4.46%. In Comparative Example 2 wherein the S-polarized light was in parallel with the slow axis of the light-transmitting substrate (the angle between the S-polarized light and the fast axis of the light-transmitting substrate was 90°), the reflectance of the optical layered body was 4.63%. Therefore, the optical layered body of Example 2 was better in anti-reflection properties.

The liquid crystal monitor A using the optical layered body of Example 2 had a particularly better bright-field contrast of the display screen, which was evaluated in the same manner as in Example 1, than the liquid crystal monitor B using the optical layered body of Comparative Example 2. The liquid crystal monitor A using the optical layered body of Example 2 showed no rainbow interference pattern and the visibility was very well improved. In contrast, the liquid crystal monitor B using the optical layered body of Comparative Example 2 showed no rainbow interference pattern but was poorer in bright-field contrast than the liquid crystal monitor A using the optical layered body of Example 2.

Example 3, Comparative Example 3

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.5 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.5 times in the direction orthogonal to the former stretching direction. This yielded a light-transmitting substrate comprising a film (nx=1.70, ny=1.60, (nx−ny)=0.10, thickness=retardation=8000 nm) and a primer layer (refractive index=1.56, thickness=100 nm).

Except for the obtained light-transmitting substrate was used, an optical layered body comprising an optical functional layer with a refractive index (nf) of 1.53 was obtained in the same manner as in Example 1. Using the obtained optical layered body, the reflectance was measured and the bright-field contrast was evaluated in the same manner as in Example 1 (the angle between the S-polarized light and the fast axis of the light-transmitting substrate was 0°). As a result, the reflectance of the optical layered body of Example 3 was 4.36%. In Comparative Example 3 wherein the S-polarized light was in parallel with the slow axis of the light-transmitting substrate (the angle between the S-polarized light and the fast axis of the light-transmitting substrate was 90°), the reflectance of the optical layered body was 4.48%. Therefore, the optical layered body of Example 3 was better in anti-reflection properties.

The liquid crystal monitor A using the optical layered body of Example 3 had a particularly better bright-field contrast of the display screen, which was evaluated in the same manner as in Example 1, than the liquid crystal monitor B using the optical layered body of Comparative Example 3. The liquid crystal monitor A using the optical layered body of Example 3 showed no rainbow interference pattern and the visibility was very well improved. In contrast, the liquid crystal monitor B using the optical layered body of Comparative Example 3 showed no rainbow interference pattern but was poorer in bright-field contrast than the liquid crystal monitor A using the optical layered body of Example 3.

Example 4, Comparative Example 4

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.0 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.8 times in the direction orthogonal to the former stretching direction. This yielded a light-transmitting substrate comprising a film (nx=1.68, ny=1.63, (nx−ny)=0.05, thickness 70 μm, retardation=3500 nm) and a primer layer (refractive index (np)=1.56, thickness=100 nm).

Except for the obtained light-transmitting substrate was used, an optical layered body comprising an optical functional layer with a refractive index (nf) of 1.53 was obtained in the same manner as in Example 1. The optical functional layer was formed on the primer layer. Using the obtained optical layered body, the reflectance was measured and the bright-field contrast was evaluated in the same manner as in Example 1 (the angle between the S-polarized light and the fast axis of the light-transmitting substrate was 0°). As a result, the reflectance of the optical layered body of Example 4 was 4.38%. In Comparative Example 4 wherein the S-polarized light was in parallel with the slow axis of the light-transmitting substrate (the angle between the S-polarized light and the fast axis of the light-transmitting substrate was 90°), the reflectance of the optical layered body was 4.47%. Therefore, the optical layered body of Example 4 was better in anti-reflection properties.

The liquid crystal monitor A using the optical layered body of Example 4 had a particularly better bright-field contrast of the display screen, which was evaluated in the same manner as in Example 1, than the liquid crystal monitor B using the optical layered body of Comparative Example 4. The liquid crystal monitor A using the optical layered body of Example 4 showed no rainbow interference pattern and the visibility was very well improved. In contrast, the liquid crystal monitor B using the optical layered body of Comparative Example 4 showed no rainbow interference pattern but was poorer in bright-field contrast than the liquid crystal monitor A using the optical layered body of Example 4.

Example 5, Comparative Example 5

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.5 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.5 times in the direction orthogonal to the former stretching direction. This yielded a light-transmitting substrate comprising a film (nx=1.70, ny=1.60, (nx−ny)=0.10, thickness=38 μm, retardation=3800 nm) and a primer layer (refractive index (np)=1.56, thickness=100 nm).

Except for the obtained light-transmitting substrate was used, an optical layered body comprising an optical functional layer with a refractive index (nf) of 1.53 was obtained in the same manner as in Example 1. The optical functional layer was formed on the primer layer. The obtained optical layered body was disposed such that the angle between the S-polarized light and the fast axis of the light-transmitting substrate was 30°, and the reflectance of the optical layered body of Example 5 was measured to be 4.39%. On the other hand, the optical layered body was disposed such that the angle between the S-polarized light and the slow axis of the light-transmitting substrate was 30°, and the reflectance of the optical layered body of Comparative Example 5 was measured to be 4.45%. Therefore, the optical layered body of Example 5 was better in anti-reflection properties.

The liquid crystal monitor A using the optical layered body of Example 5 had a better bright-field contrast of the display screen, which was evaluated in the same manner as in Example 1, than the liquid crystal monitor B using the optical layered body of Comparative Example 5. The liquid crystal monitor A using the optical layered body of Example 5 showed a rainbow interference pattern that was slightly observed through polarized sunglasses and had no disadvantage in practice, and thus the monitor A had improved visibility. In contrast, the liquid crystal monitor B using the optical layered body of Comparative Example 5 showed a rainbow interference pattern that was slightly observed through polarized sunglasses and had no disadvantage in practice; however, the monitor B was poorer in bright-field contrast than the liquid crystal monitor A using the optical layered body of Example 5.

For a liquid crystal monitor A' wherein the value of angle between the S-polarized light and the fast axis of the light-transmitting substrate was the same as that in the optical layered body of Example 5 but the angle had a negative sign, and for a liquid crystal monitor B' wherein the value of angle between the S-polarized light and the slow axis of the light-transmitting substrate was the same as that in the optical layered body of Comparative Example 5 but the angle had a negative sign, the reflectance and the bright-field contrast were evaluated. These evaluations showed the same results as those of the liquid crystal monitor A using the optical layered body of Example 5 and the liquid crystal monitor B using the optical layered body of Comparative Example 5.

Example 6, Comparative Example 6

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.5 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.5 times in the direction orthogonal to the former stretching direction. This yielded a light-transmitting substrate comprising a film (nx=1.70, ny=1.60, (nx−ny)=0.10, thickness=10 μm, retardation=1000 nm) and a primer layer (refractive index (np)=1.56, thickness=100 nm).

Except for the obtained light-transmitting substrate was used, an optical layered body comprising an optical functional layer with a refractive index (nf) of 1.53 was obtained in the same manner as in Example 1. The obtained optical layered body was disposed such that the S-polarized light was in parallel with the fast axis of the light-transmitting substrate (the angle between the S-polarized light and the fast axis of the light-transmitting substrate was 0°), and the reflectance of the optical layered body of Example 6 was measured to be 4.40%. On the other hand, the optical layered body was disposed such that the S-polarized light was in parallel with the slow axis (the angle between the S-polarized light and the fast axis of the light-transmitting substrate was 90°), and the reflectance of the optical layered body of Comparative Example 6 was measured to be 4.47%. Therefore, the optical layered body of Example 6 was better in anti-reflection properties.

The liquid crystal monitor A using the optical layered body of Example 6 had a better bright-field contrast of the display screen, which was evaluated in the same manner as in Example 1, than the liquid crystal monitor B using the optical layered body of Comparative Example 6. The liquid crystal monitor A using the optical layered body of Example 6 showed no rainbow interference pattern and the visibility was improved. In contrast, the liquid crystal monitor B using the optical layered body of Comparative Example 6 showed no rainbow interference pattern but was poorer in bright-field contrast than the liquid crystal monitor A using the optical layered body of Example 6.

Example 7, Comparative Example 7

The optical layered body obtained in Example 1 was disposed such that the angle between the S-polarized light and the fast axis of the light-transmitting substrate was 5°, and the reflectance of the optical layered body of Example 7 was measured to be 4.46%. On the other hand, the optical layered body was disposed such that the angle between the S-polarized light and the slow axis of the light-transmitting substrate was 5°, and the reflectance of the optical layered body of Comparative Example 7 was measured to be 4.72%. Therefore, the optical layered body of Example 7 was better in anti-reflection properties.

The liquid crystal monitor A using the optical layered body of Example 7 had a particularly better bright-field contrast of the display screen, which was evaluated in the same manner as in Example 1, than the liquid crystal monitor B using the optical layered body of Comparative Example 7. The liquid, crystal monitor A using the optical layered body of Example 7 showed no rainbow interference pattern and thus the visibility was very well improved. In contrast, the liquid crystal monitor B using the optical layered body of Comparative Example 7 showed no rainbow interference pattern but was poorer in bright-field contrast and antireflection properties than the liquid crystal monitor A using the optical layered body of Example 7.

For a liquid crystal monitor A' wherein the value of angle between the S-polarized light and the fast axis of the light-transmitting substrate was the same as that in the optical layered body of Example 7 but the angle had a negative sign, and for a liquid crystal monitor B' wherein the value of angle between the S-polarized light and the slow axis of the light-transmitting substrate was the same as that in the optical layered body of Comparative Example 7 but the angle had a negative sign, the reflectance and the bright-field contrast were evaluated. These evaluations Showed the same results as those of the liquid crystal monitor A using the optical layered body of Example 7 and the liquid crystal monitor B using the optical layered body of Comparative Example 7.

Example 8, Comparative Example 8

The optical layered body obtained in Example 1 was disposed such that the angle between the S-polarized light and the fast axis of the light-transmitting substrate was 10°, and the reflectance of the optical layered body of Example 8 was measured to be 4.48%. On the other hand, the optical layered body was disposed such that the angle between the S-polarized light and the slow axis of the light-transmitting substrate was 10°, and the reflectance of the optical layered body of Comparative Example 8 was measured to be 4.68%. Therefore, the optical layered body of Example 8 was better in anti-reflection properties.

The liquid crystal monitor A using the optical layered body of Example 8 had a particularly better bright-field contrast of the display screen, which was evaluated in the same manner as in Example 1, than the liquid crystal monitor B using the optical layered body of Comparative Example 8. The liquid crystal monitor A using the optical layered body of Example 8 showed no rainbow interference pattern and the visibility was very well improved. In contrast, the liquid crystal monitor B using the optical layered body of Comparative Example 8 showed no rainbow interference pattern but was poorer in bright-field contrast and antireflection properties than the liquid crystal monitor A using the optical layered body of Example 8.

For a liquid crystal monitor A' wherein the value of angle between the S-polarized light and the fast axis of the light-transmitting substrate was the same as that in the optical layered body of Example 8 but the angle had a negative sign, and for a liquid crystal monitor B' wherein the value of angle between the S-polarized light and the slow axis of the light-transmitting substrate was the same as that in the optical layered body of Comparative Example 8 but the angle had a negative sign, the reflectance and the bright-field contrast were evaluated. These evaluations showed the same results as those of the liquid crystal monitor A using the optical layered body of Example 8 and the liquid crystal monitor B using the optical layered body of Comparative Example 8.

Example 9, Comparative Example 9

The optical layered body obtained in Example 1 was disposed such that the angle between the S-polarized light and the fast axis of the light-transmitting substrate was 30°, and the reflectance of the optical layered body of Example 9 was measured to be 4.56%. On the other hand, the optical layered body was disposed such that the angle between the S-polarized light and the slow axis of the light-transmitting substrate was 30°, and the reflectance of the optical layered body of Comparative Example 9 was measured to be 4.64%. Therefore, the optical layered body of Example 9 was better in anti-reflection properties.

The liquid crystal monitor A using the optical layered body of Example 9 had a better bright-field contrast of the display screen, which was evaluated in the same manner as in Example 1, than the liquid crystal monitor B using the optical layered body of Comparative Example 9. The liquid crystal monitor A using the optical layered body of Example 9 showed no rainbow interference pattern and the visibility was very well improved. In contrast, the liquid crystal monitor B using the optical layered body of Comparative Example 9 showed no rainbow interference pattern but was poorer in bright-field contrast and antireflection properties than the liquid crystal monitor A using the optical layered body of Example 9.

For a liquid crystal monitor A' wherein the value of angle between the S-polarized light and the fast axis of the light-transmitting substrate was the same as that in the optical layered body of Example 9 but the angle had a negative sign, and for a liquid crystal monitor B' wherein the value of angle between the S-polarized light and the slow axis of the light-transmitting substrate was the same as that in the optical layered body of Comparative Example 9 but the angle had a negative sign, the reflectance and the bright-field contrast were evaluated. These evaluations showed the same results as those of the liquid crystal monitor A using the optical layered body of Example 9 and the liquid crystal monitor B using the optical layered body of Comparative Example 9.

Example 10, Comparative Example 10

A polyethylene naphthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.5 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.5 times in the direction orthogonal to the former stretching direction. This yielded a light-transmitting substrate comprising a film (nx=1.81, ny=1.60, (nx−ny)=0.21, thickness=40 μm, retardation=8400 nm) and a primer layer (refractive index (np)=1.56, thickness=100 nm).

Except for the obtained light-transmitting substrate was used, an optical layered body comprising an optical functional layer with a refractive index (nf) of 1.53 was obtained in the same manner as in Example 1. The optical functional layer was formed on the primer layer. The obtained optical layered body was disposed such that the angle between the S-polarized light and the fast axis of the light-transmitting substrate was 0°, and the reflectance of the optical layered body of Example 10 was measured to be 4.37%. On the other hand, the optical layered body was disposed such that the angle between the S-polarized light and the slow axis of the light-transmitting substrate was measured to be 0°, and the reflectance of the optical layered body of Comparative Example 10 was 4.79%. Therefore, the optical layered body of Example 10 was better in anti-reflection properties.

The liquid crystal monitor A using the optical layered body of Example 10 had a particularly better bright-field contrast of the display screen, which was evaluated in the same manner as in Example 1, than the liquid crystal monitor B using the optical layered body of Comparative Example 10. The liquid crystal monitor A' using the optical layered body of Example 10 showed no rainbow interference pattern and the visibility was very well improved. In contrast, the display screen of the liquid crystal monitor B using the optical layered body of Comparative Example 10 showed no rainbow interference pattern but was poorer in bright-field contrast than the liquid crystal monitor A using the optical layered body of Example 10.

Comparative Example 11

The optical layered body produced in Example 1 was disposed such that the angle between the S-polarized light and the fast axis of the light-transmitting substrate was 45°, and the reflectance was measured to be 4.59%. The optical layered body was also disposed such that the angle between the S-polarized light and the slow axis of the light-transmitting substrate was 45°, and the reflectance was measured to be 4.59%. That is, no difference in reflectance was observed therebetween, and thus no anti-reflection properties were achieved.

A liquid crystal monitor provided with the optical layered body of Example 9 was defined as a liquid crystal monitor A, whereas a liquid crystal monitor provided with the optical layered body of Comparative Example 11 with an angle between the S-polarized light and the fast axis of the light-transmitting substrate of 45° was defined as a liquid crystal monitor B. Then, the bright-field contrast was evaluated as in Example 1. As a result, the liquid crystal monitor A using the optical layered body of Example 9 had a better bright-field contrast of the display screen thereof than the liquid crystal monitor B using the optical layered body of Comparative Example 11. A liquid crystal monitor provided with the optical layered body of Comparative Example 11 with an angle between the S-polarized light and the slow axis of the light-transmitting substrate of 45° was defined as a liquid crystal monitor B'. The bright-field contrast of the liquid crystal monitor B' was also evaluated in the same manner, and this evaluation showed the same result as for the liquid crystal monitor B.

Then, liquid crystal monitors using the optical layered bodies of Examples 1, 7, and 8 were defined as liquid crystal monitors A, whereas a liquid crystal monitor using the optical layered body of Example 9 was defined as a liquid crystal monitor B. The bright-field contrast of each monitor was also evaluated in the same manner. This evaluation showed that each of the liquid crystal monitors A using the optical layered bodies of Example 1, Example 7, and Example 8 had a better bright-field contrast of the display screen thereof than the liquid crystal monitor B using the optical layered body of Example 9.

Comparative Example 12

The optical layered body produced in Example 3 was disposed such that the angle between the S-polarized light and the fast axis of the light-transmitting substrate was 45°, and the reflectance was measured to be 4.42%. The optical layered body was also disposed such that the angle between the S-polarized light and the slow axis of the light-transmitting substrate was 45°, and the reflectance was measured to be 4.42%. That is, no difference in reflectance was observed therebetween, and thus no anti-reflection properties were achieved. A liquid crystal monitor provided with an optical layered body with an angle between the S-polarized light and the fast axis of the light-transmitting substrate of 45° was defined as a liquid crystal monitor A, whereas a liquid crystal monitor provided with an optical layered body with an angle between the S-polarized light and the slow axis of the light-transmitting substrate of 45° was defined as a liquid crystal monitor B. The presence of a rainbow interference pattern and the bright-field contrast were evaluated in the same manner as in Example 1. These evaluations showed that no rainbow interference pattern was observed with either angle and the bright-field contrasts corresponding to the respective angles showed no difference. In comparison with the liquid crystal monitor A using the optical layered body of Example 3, the liquid crystal monitor using the optical layered body of Comparative Example 12 showed a poorer bright-field contrast regardless of the angle.

Reference Example 1

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 4.5 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.5 times in the direction orthogonal to the former stretching direction. This yielded a light-transmitting substrate comprising a film (nx=1.70, ny=1.60, (nx−ny)=0.10, thickness=28 μm, retardation=2800 nm) and a primer layer (refractive index (np)=1.56, thickness=100 nm). Except for the obtained light-transmitting substrate was used, an optical layered body comprising an optical functional layer with a refractive index (nf) of 1.53 was obtained in the same manner as in Example 1. The obtained optical layered body was disposed such that the angle between the S-polarized light and the fast axis of the light-transmitting substrate was 30°, and the reflectance in this case was measured to be 4.39%. On the other hand, the optical layered body was disposed such that the angle between the S-polarized light and the slow axis was 30°, and the reflectance in this case was 4.45%. Therefore, the reflectances showed difference and the anti-reflection properties were achieved. For the bright-field contrast, the presence of a rainbow interference pattern and the bright-field contrast were evaluated in the same manner as in Example 1 using a liquid crystal monitor A where an optical layered body was disposed with an angle between the S-polarized light and the fast axis of the light-transmitting substrate of 30° and a liquid crystal monitor B where an optical layered body with an angle between the S-polarized light and the slow axis of 30°. These evaluations showed that the liquid crystal monitor A had a better bright-field contrast, but it had a retardation of less than 3000 nm. Thus, a rainbow interference pattern was clearly observed through polarized sunglasses.

A liquid crystal monitor wherein the value of angle between the S-polarized light and the fast axis of the light-transmitting substrate was the same as that in the optical layered body of the liquid crystal monitor A of Reference Example 1 but the angle had a negative sign was defined as a liquid crystal monitor A', whereas a liquid crystal monitor wherein the value of angle between the S-polarized light and the slow axis of the light-transmitting substrate was the same as that in the optical layered body of the liquid crystal monitor B of Reference Example 1 but the angle had a negative sign was defined as a liquid crystal monitor B'. The reflectances and the bright-field contrasts of these monitors were evaluated. These evaluations showed the same results as those of the liquid crystal monitor A and the liquid crystal monitor B of Reference Example 1.

Reference Example 2

A polyethylene terephthalate material was molten at 290° C. and was passed through a film-forming die to be extruded into a sheet shape. The sheet was attached onto a water-cooled rapid-cool rotation drum and cooled down, thereby producing an unstretched film. This unstretched film was pre-heated for one minute at 120° C. and stretched at a stretching ratio of 3.8 times and 120° C. in one direction using a biaxial stretching tester (Toyo Seiki Seisaku-sho, Ltd.). On one side of the film was uniformly applied a resin composition for a primer layer that contains an aqueous dispersion of polyester resin (28.0 parts by mass) and water (72.0 parts by mass) using a roll coater. Then, this coated film was dried at 95° C. and stretched at a stretching ratio of 1.8 times in the direction orthogonal to the former stretching direction. This yielded a light-transmitting substrate comprising a film (nx=1.66, ny=1.63, (nx ny)=0.03, thickness=100 μm, retardation=3500 nm) and a primer layer (refractive index (np)=1.56, thickness=100 nm). Except for the obtained light-transmitting substrate was used, an optical layered body comprising an optical functional layer with a refractive index (nf) of 1.53 was obtained in the same manner as in Example 1. The obtained optical layered body was disposed such that the S-polarized light was in parallel with the fast axis of the light-transmitting substrate (the angle between the S-polarized light and the fast axis of the light-transmitting substrate was 0°), and the reflectance in this case was measured to be 4.41%. On the other hand, the obtained optical layered body was disposed such that the S-polarized light was in parallel with the slow axis of the light-transmitting substrate (the angle between the S-polarized light and the slow axis of the light-transmitting substrate was 0°), and the reflectance in this case was measured to be 4.43%. Therefore, the reflectances showed slight difference and the antireflection properties were achieved. Further, a liquid crystal monitor provided with an optical layered body with an angle between the S-polarized light and the fast axis of the light-transmitting substrate of 0° was defined as a liquid crystal monitor A, whereas a liquid crystal monitor provided with an optical layered body with an angle between the S-polarized light and the slow axis of 0° was defined as a liquid crystal monitor B. For each of these monitors, the presence of a rainbow interference pattern and the bright-field contrast were evaluated in the same manner as in Example 1. The evaluation showed that no rainbow interference pattern was observed with either angle, and the bright-field contrasts corresponding to the respective angles showed no difference and were as low as (nx−ny)=0.03. Therefore, these monitors were poorer in the bright-field contrast than the liquid crystal monitors using the optical layered bodies of Examples 4 and 5.

Reference Example 3

A triacetyl cellulose substrate (TD80ULM, FUJIFILM Corp., nx=1.48026, ny=1.48019, (nx−ny)=0.0007, thickness=80 μm, in-plane phase difference: 5.6 nm) was prepared. On this substrate was disposed an optical functional layer (refractive index (nf)=1.53) in the same manner as in Example 1, thereby providing an optical layered body.

The obtained optical layered body was disposed such that the S-polarized light was in parallel with the fast axis of the light-transmitting substrate (the angle between the S-polarized light and the fast axis of the light-transmitting substrate was 0°), and the reflectance was measured to be 4.39%. The obtained optical layered body was disposed such that the S-polarized light was in parallel with the slow axis of the light-transmitting substrate (the angle between the S-polarized light and the slow axis of the light-transmitting substrate was 0°), and the reflectance was also measured to be 4.39%. Thus, the reflectances showed no difference. Although the reflectances showed no difference, the light-transmitting substrate was a triacetyl cellulose substrate and thus this optical layered body had no disadvantage in reflectance. A liquid crystal monitor provided with an optical layered body with an angle between the S-polarized light and the fast axis of the light-transmitting substrate of 0° was defined as a liquid crystal monitor A, whereas a liquid crystal monitor provided with an optical layered body with an angle between the S-polarized light and the slow axis of the light-transmitting substrate of 0° was defined as a liquid crystal monitor B. For each of these monitors, the presence of a rainbow interference pattern and the bright-field contrast were evaluated in the same manner as in Example 1. The evaluation showed that no rainbow interference pattern was observed and the bright-field contrasts showed no difference with either angle. Reference Example 3 confirms that a light-transmitting substrate having no in-plane birefringence which has been conventionally used for liquid crystal display devices has no disadvantages in the bright-field contrast and does not suffer a rainbow interference pattern, thereby having no disadvantage in visibility. The examples each achieved the visibility as good as that in Reference Example 3.

INDUSTRIAL APPLICABILITY

The optical layered body and polarizer of the present invention can be suitably applied to, for example, cathode ray tube display devices (CRTs), liquid crystal displays (LCDs), plasma display panels (PDPs), electroluminescence displays (ELDs), field emission displays (FEDs), touch-screens, electronic paper, and tablet PCs.

The invention claimed is:

1. An image display device, comprising:
a display screen; and a polarizer that is configured to be disposed at a surface of the image display device,
the polarizer comprising:
a polarizing element; and
an optical layered body disposed on the polarizing element,
wherein the optical layered body comprises:
a light-transmitting substrate having in-plane birefringence; and
an optical functional layer disposed on one surface of the light-transmitting substrate,
the light-transmitting substrate has a slow axis that is along a direction showing a greater refractive index and a fast axis that is orthogonal to the slow axis,
the light-transmitting substrate has a retardation Re represented by a formula: Re=(nx−ny)×d, in a range from 8,000 nm to 25,000 nm, where nx represents a refractive index in the slow axis direction of the light-transmitting substrate, ny represents a refractive index in the fast axis direction of the light-transmitting substrate, and d represents a thickness of the light-transmitting substrate, and
the difference between the refractive indexes of the light-transmitting substrate in the slow axis direction and in the fast axis direction as represented by a formula: nx−ny is 0.05 or greater,
the polarizing element has an absorption axis that extends in a horizontal direction relative to the display screen,
the optical layered body and the polarizing element are disposed such that the slow axis of the light-transmitting substrate and the absorption axis of the polarizing element are orthogonal to each other,
the polarizer is configured so as to be disposed on the display screen of the image display device such that the slow axis of the light-transmitting substrate is in parallel with a vertical direction of the display screen, and
the image display device is designed to be placed in a room in which the device receives S-polarized light that is in parallel with the fast axis of the light-transmitting substrate, wherein the S-polarized light is light reflected on a floor surface, and the S-polarized light is in parallel with the floor surface.

2. The image display device according to claim 1, wherein the image display device is a VA-mode or IPS-mode liquid crystal display device comprising a white-light-emitting diode as a backlight light source.

3. The image display device according to claim 1, wherein the optical layered body further comprises a primer layer disposed between the light-transmitting substrate and the optical functional layer,
wherein a thickness of the primer layer is in a range from 3 to 30 nm, provided that:
the primer layer has a refractive index np that is greater than the refractive index nx in the slow axis direction of the light-transmitting substrate and that is greater than a refractive index nf of the optical functional layer, as represented by a formula: np>nx and np>nf, or
the primer layer has a refractive index np that is smaller than the refractive index ny in the fast axis direction of the light-transmitting substrate and that is smaller than the refractive index nf of the optical functional layer, as represented by a formula: np<ny and np<nf.

4. The image display device according to claim 1, wherein the optical layered body further comprises a primer layer disposed between the light-transmitting substrate and the optical functional layer,
wherein a thickness of the primer layer is in a range from 65 to 125 nm, provided that:
the primer layer has a refractive index np that is greater than the refractive index nx in the slow axis direction of the light-transmitting substrate but that is smaller than a refractive index nf of the optical functional layer, as represented by a formula: nx<np<nf, or
the primer layer has a refractive index np that is smaller than the refractive index ny in the fast axis direction of the light-transmitting substrate but that is greater than the refractive index nf of the optical functional layer, as represented by a formula: nf<np<ny.

5. The image display device according to claim 1, wherein the optical layered body further comprises a primer layer disposed between the light-transmitting substrate and the optical functional layer,
   wherein the primer layer has a refractive index np that falls between the refractive index ny in the fast axis direction of the light-transmitting substrate and the refractive index nx in the slow axis direction of the light-transmitting substrate, as represented by a formula: ny<np<nx.

6. A method for producing an image display device, the image display device comprising:
   a polarizing element;
   an optical layered body, which comprises a light-transmitting substrate and an optical functional layer disposed on one surface of the light-transmitting substrate; and
   a display screen,
   wherein the polarizing element has an absorption axis that extends in a horizontal direction relative to the display screen,
   the light-transmitting substrate has in-plane birefringence,
   the light-transmitting substrate has a slow axis that extends along a direction showing a greater refractive index and a fast axis that is orthogonal to the slow axis,
   the light-transmitting substrate has a retardation Re represented by a formula: Re=(nx−ny)×d, in a range from 8,000 nm to 25,000 nm, where nx represents a refractive index in the slow axis direction of the light-transmitting substrate, ny represents a refractive index in the fast axis direction of the light-transmitting substrate, and d represents a thickness of the light-transmitting substrate,
   the difference between the refractive indexes of the light-transmitting substrate in the slow axis direction and in the fast axis direction, as represented by a formula: nx−ny is 0.05 or greater, and
   the image display device is designed to be placed in a room in which the device receives S-polarized light that is in parallel with the fast axis of the light-transmitting substrate, wherein the S-polarized light is light reflected on a floor surface, and the S-polarized light is in parallel with the floor surface, and
   the method comprising:
   disposing the optical layered body such that the slow axis of the light-transmitting substrate is in parallel with a vertical direction of the display screen of the image display device.

7. A method for improving visibility of an image display device,
   the image display device comprising:
   a polarizing element;
   an optical layered body, which comprises a light-transmitting substrate and an optical functional layer disposed on one surface of the light-transmitting substrate; and
   a display screen,
   wherein the polarizing element has an absorption axis that extends in a horizontal direction relative to the display screen,
   the light-transmitting substrate has in-plane birefringence,
   the light-transmitting substrate has a slow axis that extends along a direction showing a greater refractive index and a fast axis that is orthogonal to the slow axis,
   the light-transmitting substrate has a retardation Re represented by a formula: Re=(nx−ny)×d, in a range from 8,000 nm to 25,000 nm, where nx represents a refractive index in the slow axis direction of the light-transmitting substrate, ny represents a refractive index in the fast axis direction of the light-transmitting substrate, and d represents a thickness of the light-transmitting substrate,
   the difference between the refractive indexes of the light-transmitting substrate in the slow axis direction and in the fast axis direction, as represented by a formula: nx−ny is 0.05 or greater, and
   the image display device is designed to be placed in a room in which the device receives S-polarized light that is in parallel with the fast axis of the light-transmitting substrate, wherein the S-polarized light is light reflected on a floor surface, and the S-polarized light is in parallel with the floor surface, and
   the method comprising:
   disposing the optical layered body such that the slow axis of the light-transmitting substrate is in parallel with a vertical direction of the display screen of the image display device.

* * * * *

UNITED STATES PATENT AND TRADEMARK OFFICE
CERTIFICATE OF CORRECTION

PATENT NO. : 10,048,522 B2
APPLICATION NO. : 14/200837
DATED : August 14, 2018
INVENTOR(S) : Kuroda Page 1 of 1

It is certified that error appears in the above-identified patent and that said Letters Patent is hereby corrected as shown below:

In the Claims

Column 40, Lines 14-15 Claim 1: delete "by a formula: nx ny is 0.05 or greater." and insert -- by a formula: nx - ny is 0.05 or greater. --.

Signed and Sealed this
Fourth Day of December, 2018

Andrei Iancu
*Director of the United States Patent and Trademark Office*